Figure 1:
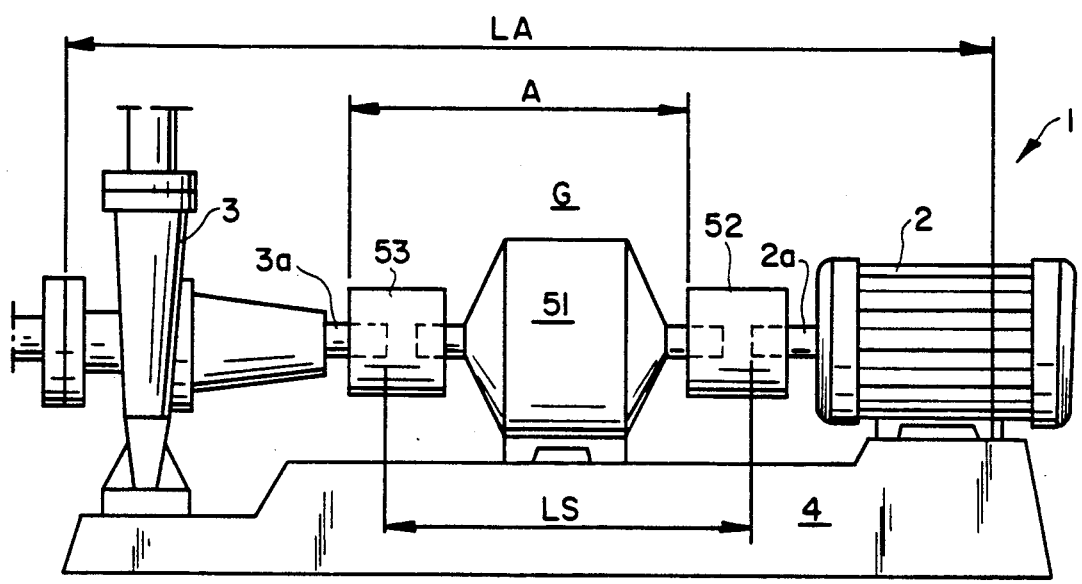

United States Patent [19]
Jonsson et al.

[11] Patent Number: 5,119,923
[45] Date of Patent: Jun. 9, 1992

[54] TORQUE TRANSMITTING DEVICE

[75] Inventors: Arne Jonsson, Hagfors; Elov Hallën, Järna, both of Sweden

[73] Assignee: Aktiebolaget Control Drive i Värmland, Lesjofors, Sweden

[21] Appl. No.: 543,828

[22] PCT Filed: Feb. 1, 1989

[86] PCT No.: PCT/EP89/00084
§ 371 Date: Jul. 9, 1990
§ 102(e) Date: Jul. 9, 1990

[87] PCT Pub. No.: WO89/07209
PCT Pub. Date: Aug. 10, 1989

[30] Foreign Application Priority Data
Feb. 5, 1988 [SE] Sweden .............................. 8800386

[51] Int. Cl.$^5$ .......................... F16D 3/82; F16D 25/04
[52] U.S. Cl. .......................... 192/70.12; 192/85 AA; 192/103 F
[58] Field of Search ............ 192/85 AA, 103 F, 70.12

[56] References Cited

U.S. PATENT DOCUMENTS

| 4,187,940 | 2/1980 | Ratliff et al. ..................... 192/88 A |
| 4,899,861 | 2/1990 | Cummings, III .............. 192/85 AA |
| 4,997,071 | 3/1991 | Villata et al. ............. 192/85 AA X |

FOREIGN PATENT DOCUMENTS

| 0242328 | 10/1908 | Fed. Rep. of Germany . |
| 3619351 | 10/1987 | Fed. Rep. of Germany . |
| 2379724 | 9/1978 | France . |
| 62-98033 | 10/1987 | Japan . |

*Primary Examiner*—Dwight Diehl
*Assistant Examiner*—Andrea Pitts
*Attorney, Agent, or Firm*—Cushman, Darby & Cushman

[57] ABSTRACT

To enable a torque transmitting device to be mounted between and removed from spaced aligned stub shafts (2a, 3a) of an electric motor (2) and a pump (3) without moving the stub shafts, the device is divisible and comprises three rotary members (15, 20, 30) connected serially with an elastic coupling (13B) and a controllable variable subclutch (10C) and a stationary member (40) able to transmit control signals to the clutch. At least three of the four members (15, 20, 30, 40) have central openings allowing insertion of the stub shafts.

28 Claims, 9 Drawing Sheets

TORQUE TRANSMITTING DEVICE

The present invention relates to a device for connecting an electric motor rotating with at least nearly constant rotational speed with a pump forming with the motor an assembly where the parts are spaced one from the other as prescribed by standards, said motor having a housing with an end face from which with a given free length projects an output stub shaft, and the pump having an end face turned towards the said end face of the motor and from which with a given free length, and essentially co-axially with the said output stub shaft, projects an input stub shaft, the adjacent free ends of the two stub shafts being separated by a gap with given axial length.

The electric motor may be connectable to a 50 or 60 Hz net, have highest speed of 3000 to 3600 r.p., and the transmitted torque should exceed 50 Newton meters, with an uppermost limit of more than 5000 Newton meters, and an average value of about 500 Newton meters, corresponding to a power of about 75 kW at 1500 r.p.m. and about 90 kW at 1800 r.p.m.

Primarily, the invention relates to assemblies in accordance with national or international standards, such as, for electric motors, IEC-standards (International Electrotechnical Commission) or ANSI/NEMA-standards (American National Standards Institute/National Electrical Manufacturers' Association), and, as to pumps, ISO-standards (International Organization for Standardization) or ANSI-standards.

The said standards define certain dimensions which are critical for the connection or interchange possibilities, such dimensions being, with respect to the stub shafts of the machines, their diameter, their free length and the free radial space (i.e. the distance from the centre line of the stub shaft to a hypotethic coaxial cylindric surface, tangential to a closest adjacent obstruction, formed by e.g. the base plate or the like of the assembly).

Normally, the motor and the pump are interconnected by means of an elastic shaft coupling to compensate for possible small deviations from a strictly coaxial position of the two stub shafts, and the pumps are mounted in the assembly in one of the two following ways.

Either are the motor and the pump mounted at such an axial distance from each other, that the said coupling, but not any bigger unit, may be received in the gap between the juxtapposed front surfaces of the two stub shafts, and the above said gap will then be of a size of a few tenths millimeters. Or, alternatively, the gap is given a size (in the order from about 100 mm) facilitating disassembly of one of the members of the assembly, and such a gap may be bridged by a "spacer"-element, which, optionally, may be designed as an elastic shaft coupling of the "spacer"-type, i.e. in principle two conventional elastic shaft couplings, mounted one on the end of each shaft portion bridging the gap.

In the present specification are in the term "elastic shaft coupling" also included such other units, as e.g. double universal joints, which have the same function.

Another solution of the disassembling problem is to bridge the gap, according e.g. to SE-C-216.789, by means of an obliquely cut end portion of an unusually long stub shaft of the pump, and which end portion may be temporarily removed, if necessary.

However, interconnection by means of one of the above mentioned arrangements does not permit control of the speed of the pump relative to that of the motor. In practice, however, the possibility of such a control, infinite and continuous, is in the pump field often highly desirable, possibly indispensible.

Devices for transmission of rotary motion or torque by means of steeplessly and continuously adjustable speed controllers have become known in different designs and operate according to various principles, e.g. so called hydrodynamic and hydromechanic slip couplings (also called viscohydraulic slip couplings).

Most of the known speed controllers comprise a stationary or fixed member, to which the non-rotating outer parts of the controller are connected, among them a means for adjustment of a desired speed condition or, with automatic control, a means generating a control signal to the same purpose.

Further, two rotatable members are provided which cooperate one with the other by means of operative elements, the first said member being non-rotatable connected to the motor to rotate with the same speed as the motor, and the second member being non-rotatably connected to the driven machine to rotate with the same (controlled) speed as the machine.

In the present context, and as will be explained more in detail below, a member filling the function of an elastic coupling defines a third rotatable member which is in the assembly disposed between the motor and the pump and is so far indispensable as the assembly would not be operable without it.

In the present specification and in the attached claims the term non-rotatable includes even a connection which, while transmitting torque, allows for a certain degree of torsional elasticity in order to suppress torsional oscillations. In viscohydraulic couplings the operative elements of both rotary parts are defined by disc sets.

Couplings comprising torque-transmission discs are known for different purposes, e.g. according to DE-A-3,619.351 as a compact on/off coupling for synchronization of crankshafts in a multi-split internal combustion engine, or according to DE-C-242.328 as a device for speed variation, where the torque-transmission discs, possibly provided with strips, ribs, vanes, vane-shaped projections or recesses, or the like, are mounted at an unvariable mutual spacement and operate in combination with a separate friction coupling.

Known speed controllers normally embody a separate unit which is as a third member interposed between the motor and the driven machine, whereby the axial length of the assembly considerably increases.

Such a solution is described e.g. in GB-A-431.215 and is schematically shown in FIG. 1 of the accompanying drawing, wherein an assembly 1 comprises a base 4, an electric motor 2 and a pump 3, between which there is interposed, by means of two elastic couplings 52, 53, a conventional speed controller 51, which is of just about the same size as the motor 2 or the pump 3. The free ends of the output stub shaft 2a of the motor and of the input stub shaft 3a of the pump have to be separated by a gap G with an axial length LS in the order of several hundreds of millimeters (as a rule at least 500 mm).

Both, this axial length LS, and the axial length LA of the entire assembly, will then by far exceed the standardized values. The length of the assembly has thus been extended by a distance A beyond the normal or standardized length.

It is also known to build together the speed controller with the motor and/or with the pump, e.g. according to SE-C-413.540, U.S. Pat. No. 3,433,162 or DE-A-2,922.997. All these are cases of special design, i.e. machines that have a built-in speed control function from the outset, and where such a function cannot be added subsequently, to replace a normal coupling without speed control.

It is an object of the present invention to provide a device which may be instead of a conventional elastic coupling mounted in an assembly comprising a motor and a pump without the necessity to change the axial and radial dimensions of the assembly, thus retaining the facility to dismount the assembly laterally, if this was possible therebefore.

When a device according to the present invention is built-in into an assembly right from the beginning, the advantage is obtained that all standardized measurements and parameters depending on the assembly (e.g. the dimensions of the floor space, the height of the room etc) may remain unchanged, i.e. the same as with an assembly without a speed control facility. An even more important advantage is that the device according to the invention may also, without changing the installation, be built-in afterwards into an already existing, standardized assembly which from the outset did not have any speed control facilities.

The possibility to build-in the device according to the invention afterwards is extremely important, mainly in the heavy processing industry, where not only the circumstance that there is no need to increase the floor space, matters very much, but where it is primarily important that there is no need to interrupt operation for any considerable period of time, or to stop the equipment entirely in order to alter the foundation. Using the device according to the present invention, the whole replacement operation may be carried out within the course of a few hours, i.e. during a normal operational stop, e.g. overnight.

Considering a number of e.g. about 25.000 (which is a number just about corresponding to the real situation in Sweden), motor-pump assemblies within the torque range mentioned above, considerable gains in energy and costs (in the order of one billion U.S. dollars) may be obtained.

Figure 2:
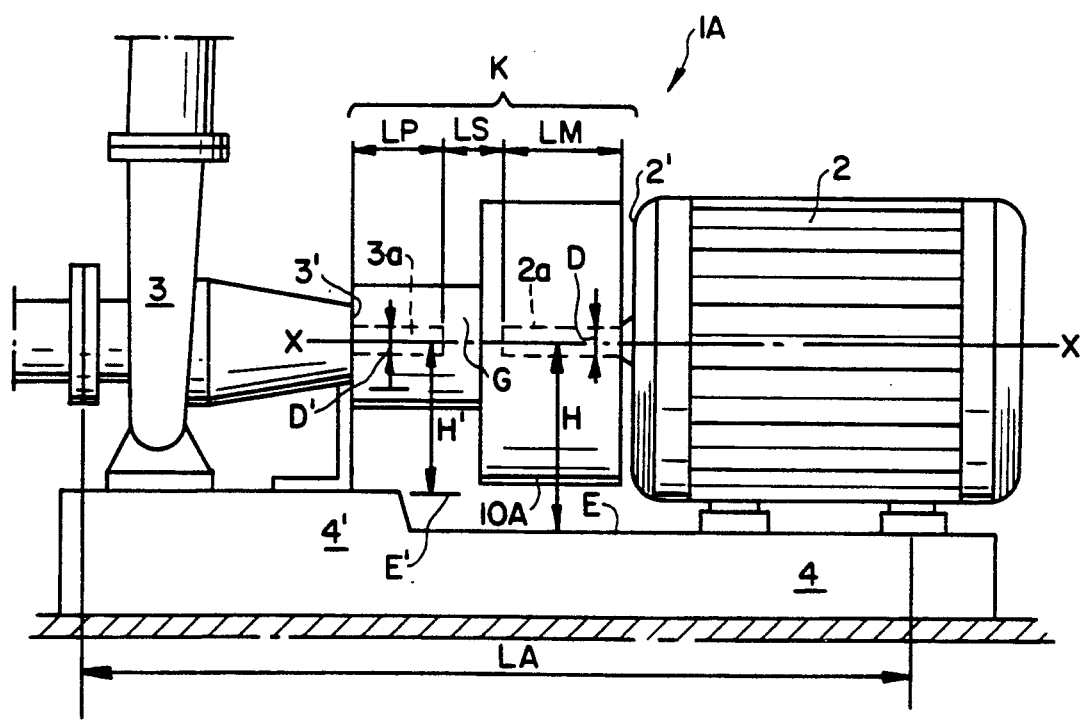
Figure 4:
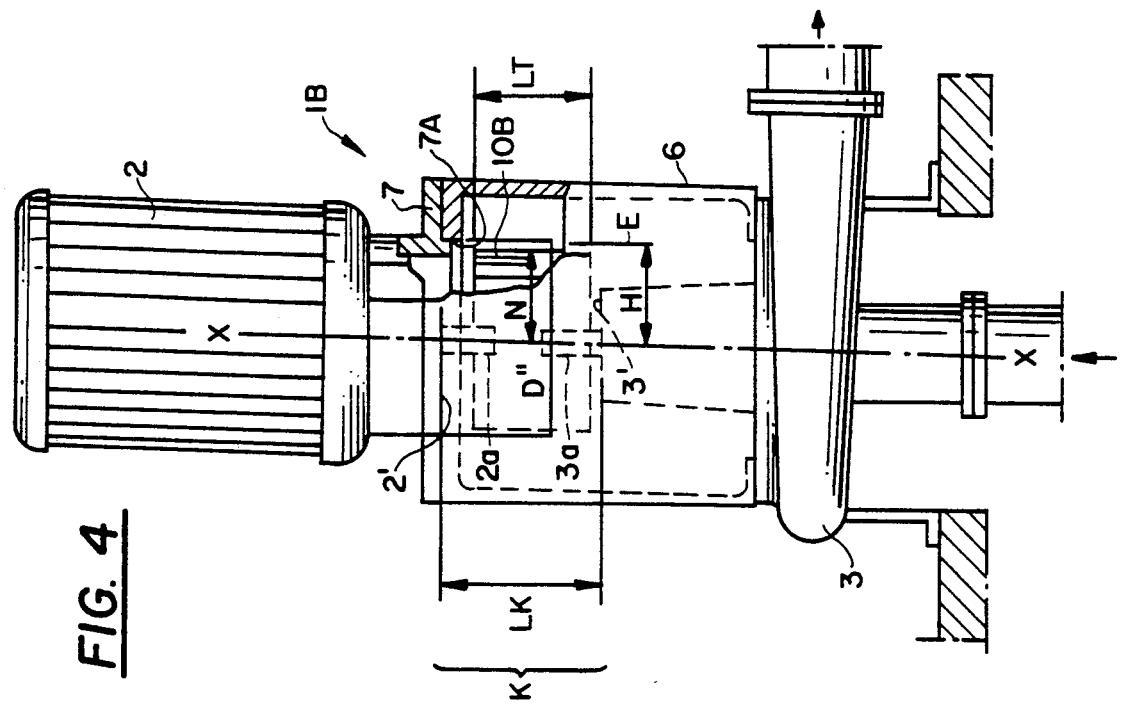
Figure 3:
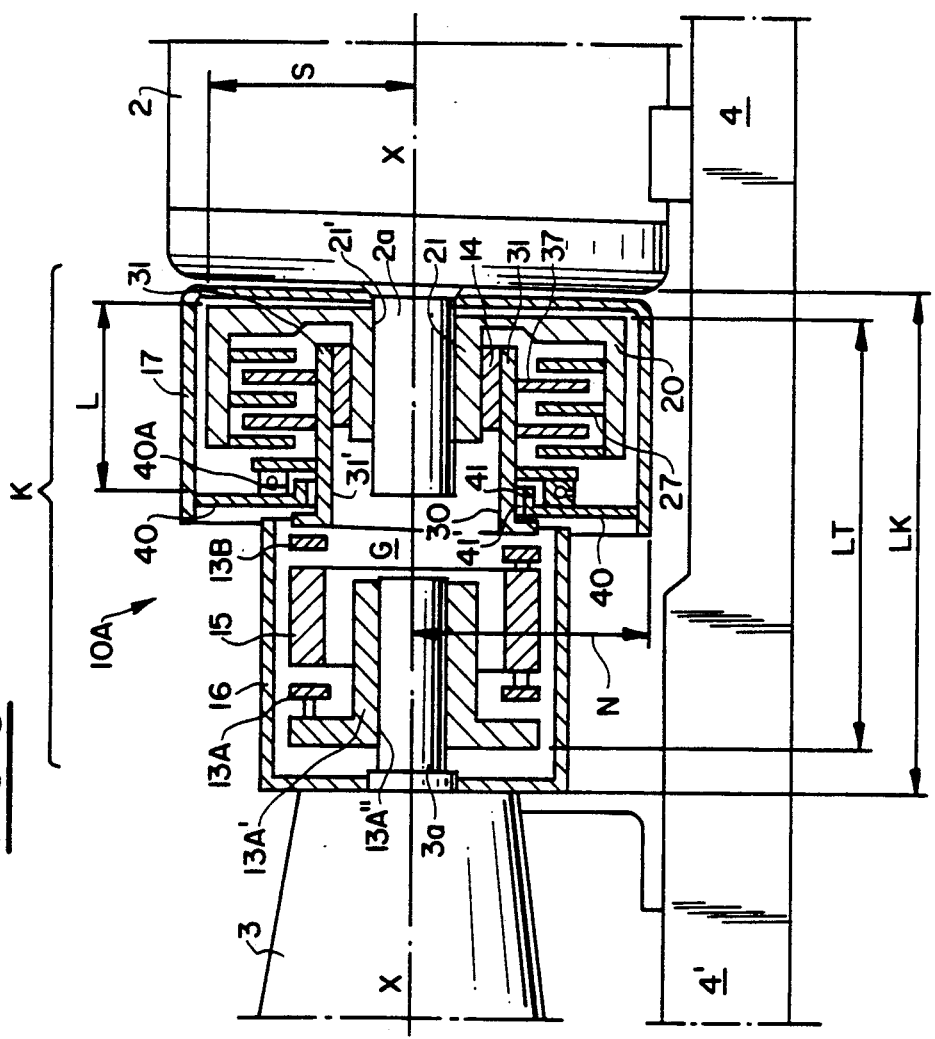
Figure 5:
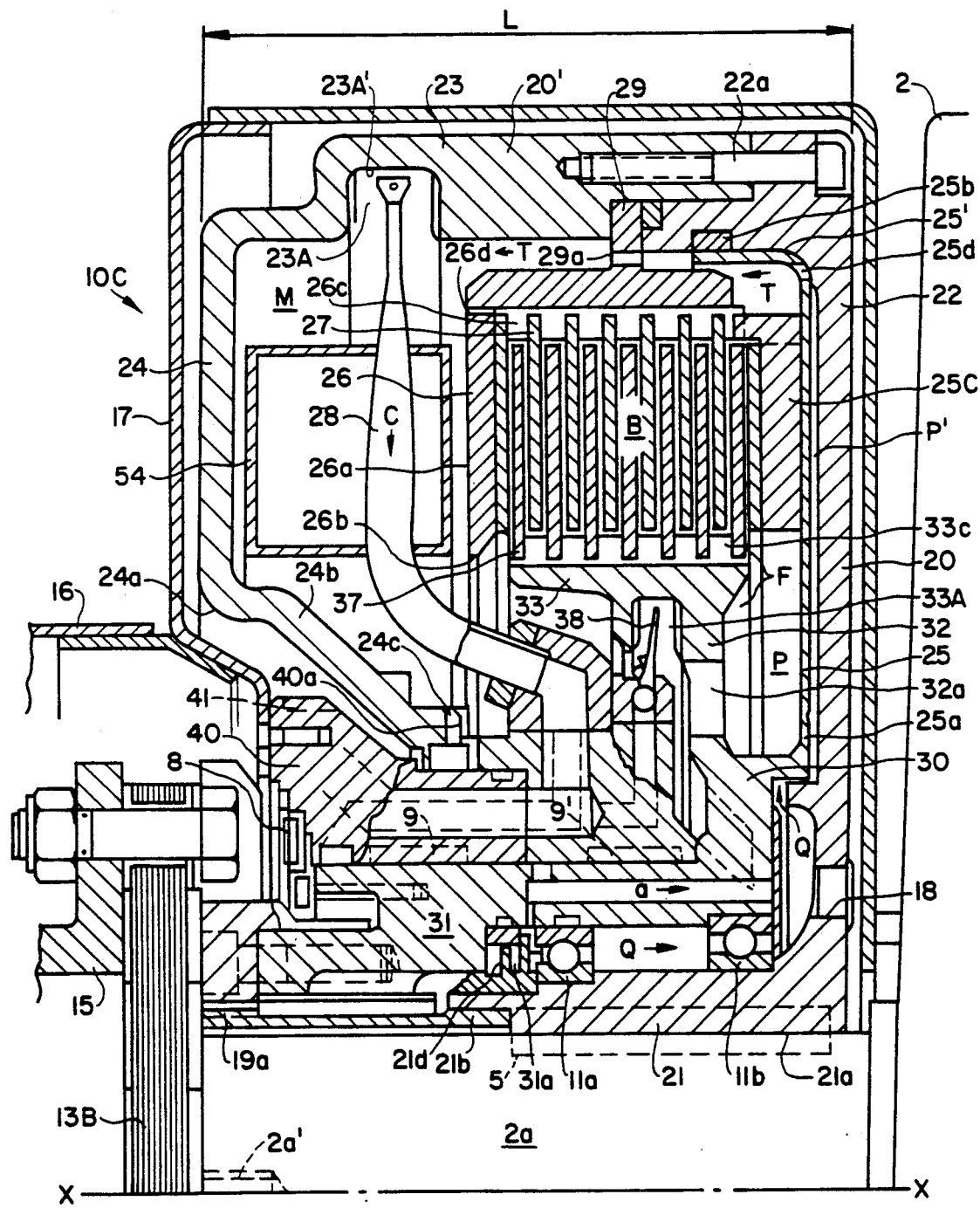
Figure 5B:
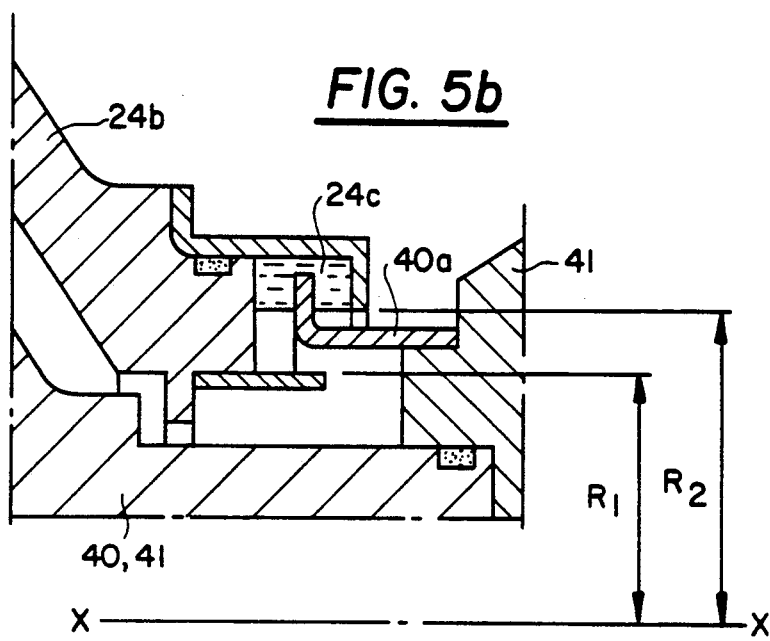
Figure 5A:
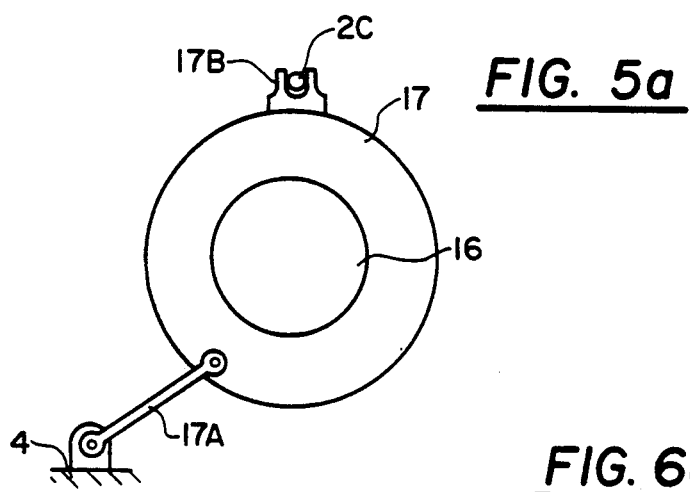
Figure 6A:
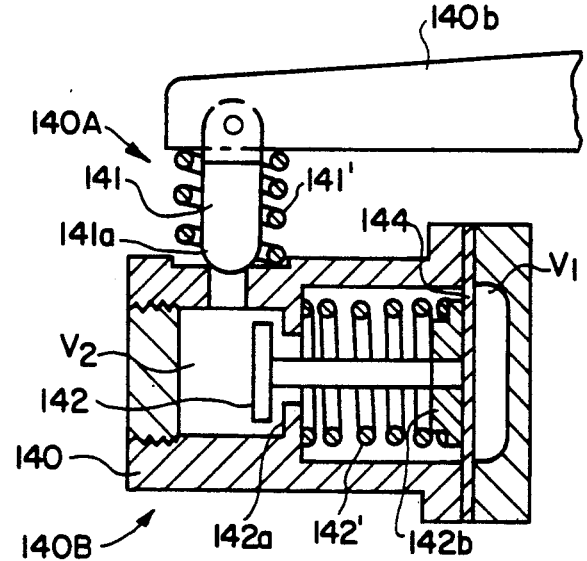
Figure 6:
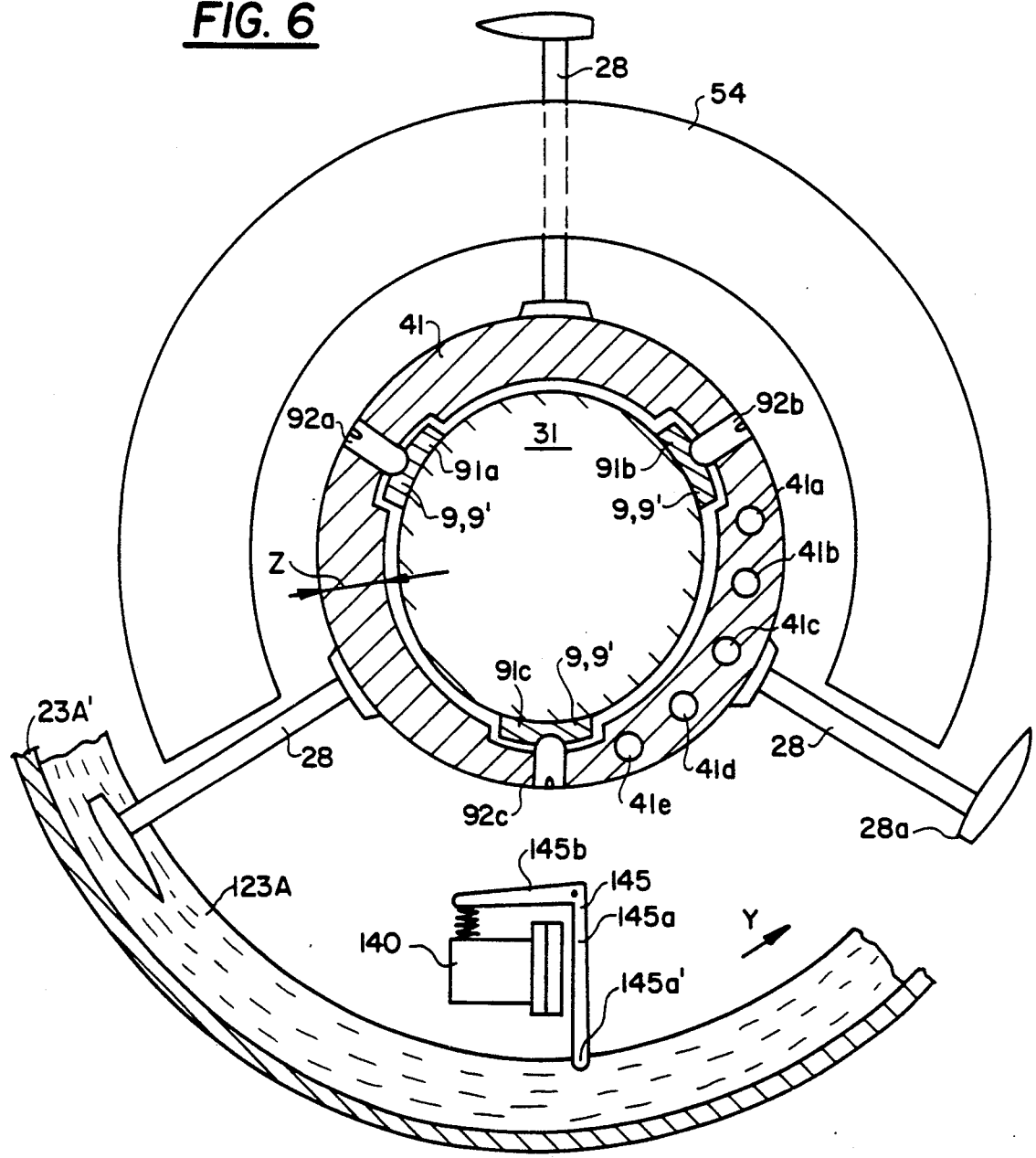
Figure 7:
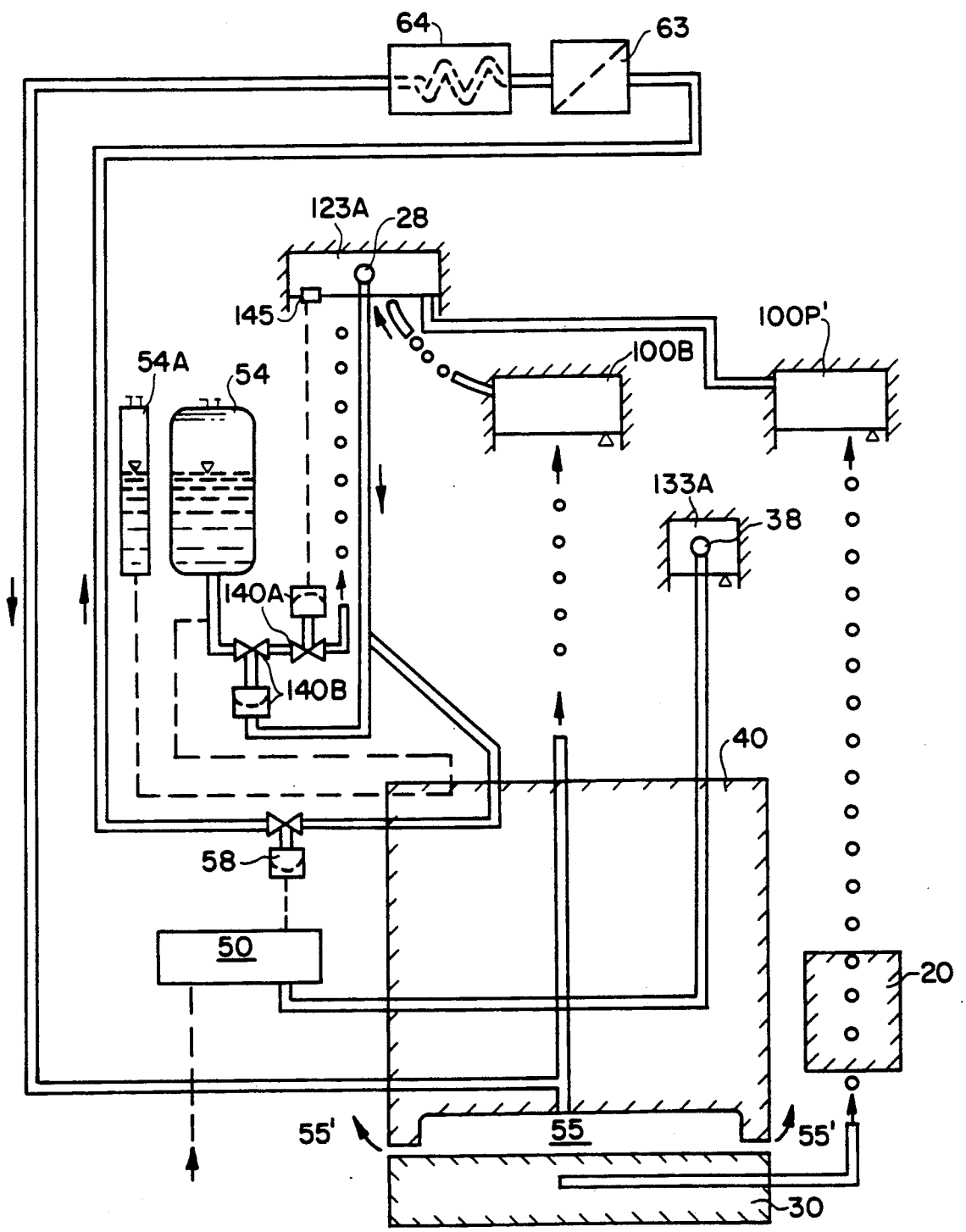
Figure 8:
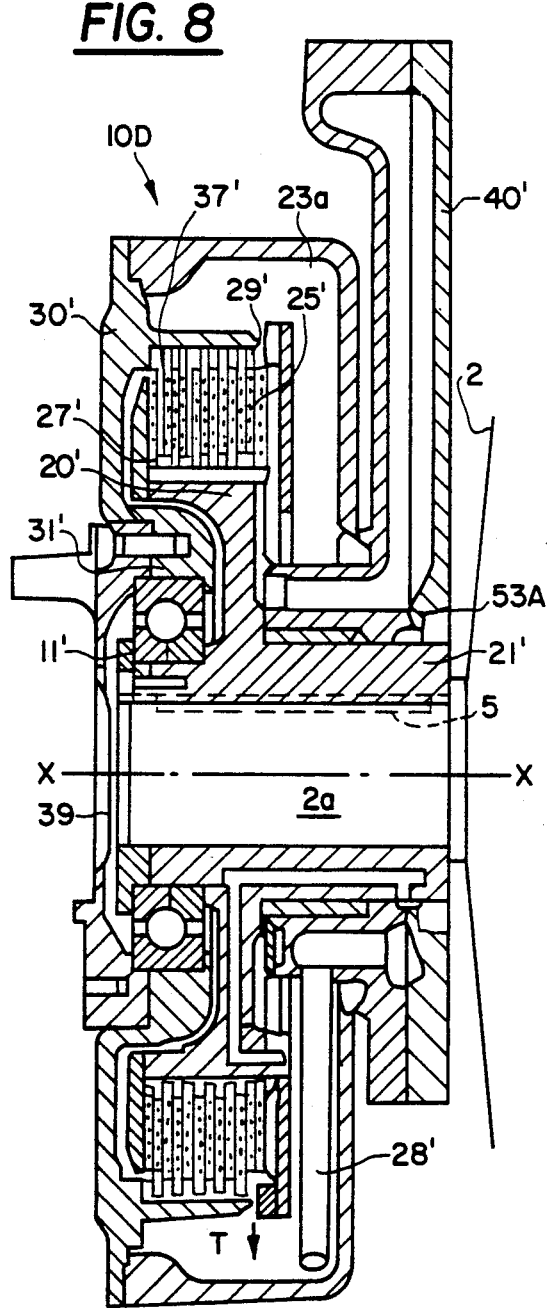
Figure 9:
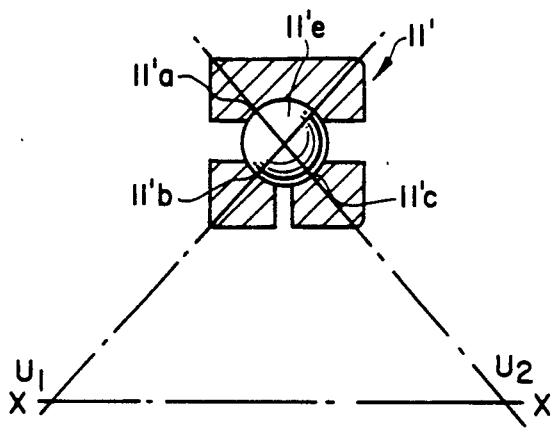
Figure 10A:
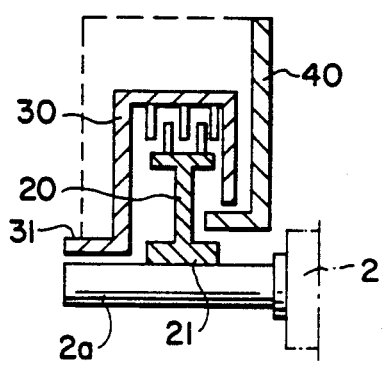
Figure 10B:
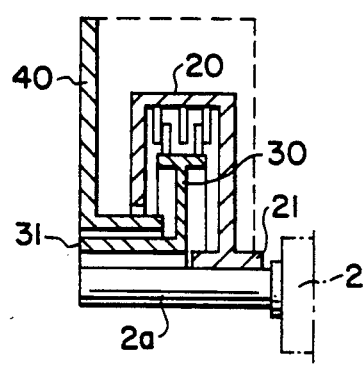
Figure 11A:
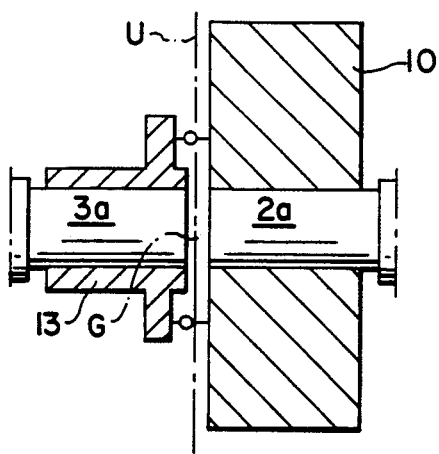
Figure 11B:
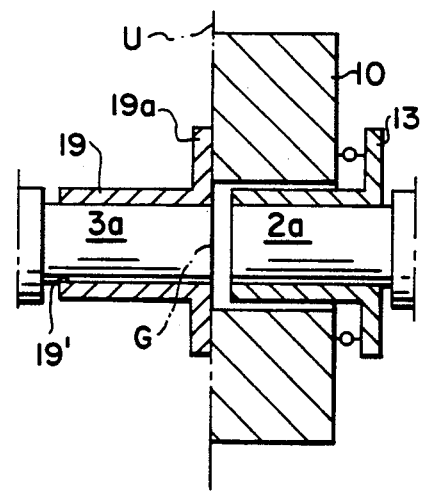

The invention will now be described more in detail with reference to the accompanying drawings, which show exemplary embodiments, and in which FIG. 2 is a side view of a first embodiment of an assembly with a device according to the present invention, FIG. 3 is a longitudinal section, at a larger scale, through the assembly according to FIG. 2, FIG. 4 is a side view, partly in section, through a second embodiment of an assembly provided with a device according to the invention, FIG. 5 illustrates, at an even larger scale than in FIG. 4, a longitudinal section through one half of a third embodiment of the device according to the invention, FIG. 5a shows, at a smaller scale, a rotational stop in the device according to FIG. 5, FIG. 5b shows in cross-section a barrier seal in the device according to FIG. 5, FIG. 6 shows, at a larger scale, a cross-section through the device according to FIG. 5, FIG. 6a is a section through an oil filling means in the device according to FIG. 5, FIG. 7 is an operational chart of the device according to FIGS. 5 and 6, FIG. 8 is a longitudinal section through a fourth embodiment of the device according to the invention, FIG. 9 shows a bearing in the device according to FIG. 8, FIGS. 10A and 10B show, very schematically, two alternatives of the mutual disposition of the two rotatable members, FIGS. 11A and 11B show two alternatives of the arrangement with a narrow gap, and FIGS. 12A-12D show four alternatives of an arrangement with a broader gap.

Parts having identical functions are in all figures of the drawings denoted by identical or analogous reference characters.

According to FIG. 2, an assembly 1A having a total length LA comprises an electric motor having parameters within the above said limits, a pump 3, and a base 4 on which the motor and the pump are stationarily mounted with their feet. The motor 2 has an end face 2' turned towards the pump 3 and from which protrudes an output stub shaft 2a with a free length LM and a diameter D. The pump 3 has an end face 3' turned towards the end face 2' of the motor 2, and from which protrudes an input stub shaft 3a with a free length LP and a diameter D'.

The two stub shafts 2a,3a are coaxial or at least nearly coaxial (centre line X—X), and their juxtaposed end faces are separated by a gap G with the length LS. The dimensions D, D', LM, LP, LS and, to a certain extent LA, use to belong to the standardized dimensions, and they are, particularly LA and LS, standardized with a view to the stub shafts being interconnected either by means of a conventional elastic shaft coupling, or by means of a "spacer" type elastic shaft coupling.

Due to this standardization, also the dimensions of the space K around the two stub shafts 2a,3a and between the said end faces 2', 3' are generally determined. Radially, this space K is limited by hypothetic cylindrical surfaces which are coaxial with the stub shafts 2a,3a and comprise, as generatrixes, lines E and E' which extend parallel with the centre line of the respective stub shaft and, thereby constitute a tangent to any obstacle, which, in radial direction, lies closest to said centre line.

Thus, for the output stub shaft 2a, this line E is tangent to the base 4 at the right hand portion thereof, and thus has a radial distance H from the centre line X—X, whereas for the input stub shaft 3a is the line E' tangent to the base 4 at the elevated left hand portion 4' of the base 4, and thus has a radial distance H', smaller than the radial distance H, from the centre line X—X.

The motor 2 and the pump 3 are interconnected by means of a device according to the present invention, entirely comprised in the space K and shown more in detail in FIG. 3.

According to FIG. 3, the device 10A comprises a first rotable member 20 with a central portion 21 defined by a tubular hub and having its central bore 21' non-rotatably secured to the output stub shaft 2a of the motor 2, and a second rotatable member 30 which has a central portion 31 defined by a radially mounted tubular hub which with the aid of an interposed freely rotatable sleeve bearing 14 is by its central opening 31' rotatably mounted on the outside of the central portion 21 of the first rotatable member 20.

The device 10A comprises further a third rotatable member defined by a shaft coupling of the "spacer"

type, comprising two elastic couplings 13A, 13B and a tubular spacer element 15. The coupling 13A has a central portion 13A' with a central bore 13A", by means of which the central portion is non-rotatably mounted on the input stub shaft 3a. The central portion is surrounded by a tubular outer casing 16 which is e.g. rigidly secured to the pump 3.

The first rotable member 20 carries a set of outer operative elements 27, and the second rotatable member 30 carries a set of cooperating inner operative elements 37. These inner and outer operative elements are embodied by torque transmission discs for mechanical or hydrodynamical torque transmission, known per se, by the term "torque transmission discs" are also covered discs with strips, ribs, vanes etc. The embodiment corresponds to a known coupling of the above mentioned viscohydraulic type, and its function will be described more in detail with reference to the embodiment according to FIG. 5.

The stationary member, by which term is in the present specification and in the accompanying claims understood "non rotating member" (which however may be subject to other movements, e.g. axial) in the device 10A consists of a maneuver disc 40 which controls the axial position of e.g. the above mentioned operative elements.

The maneuver disc 40 is provided with an axial bearing 40A and has a hub-shaped central portion 41 with a central bore 41', by means of which it is rotatably mounted on the hub portion 31 of the second rotatable member 30. Any of the central bores 21', 31', 41', 13A" constitutes a central attachment opening for the entire device 10A. The largest rotatable member, i.e. member 20, has a maximum radial dimension S.

The entire device 10A, having an axial length LT, is comprised within the space K and, provided with a stationary outer casing 17, has maximum radial dimensions, such as N, which do not exceed the respective radial dimension H and H' (FIG. 2) which are at disposal.

In FIG. 4 is shown an assembly 1B with a vertical rotational center line X—X. The pump 3 carries a support frame 6 which is provided with an upper support disc 7 in which a circular opening 7A with a diameter D" is arranged. The motor 2 is by its end with the end face 2' inserted into into the opening 7A.

A device 10B according to the present invention is mounted in the support frame 6. The device 10B, in order to be introducible in the support frame 6, must be able to pass through the opening 7A, so that in the present case the generatrix E of the hypotethic cylindrical surface is defined by a tangent to the edge of the opening 7A, said edge embodying an "obstacle", although it is situated outside the space K.

The dimension corresponds to half the diameter D", and the dimension N has to be still somewhat smaller.

According to another aspect of the present invention, the principle thereof may be advantageously realized by means of a viscohydralic slip coupling made to embody a speed controller. Such a device is shown in FIGS. 5 and 6 and comprises a first rotatable member 20, embodying an outer disc carrier, and a second rotatable member 30, embodying an inner disc carrier, a third rotatable member, defining an elastic shaft coupling of the same type as in FIG. 3 (only the portions 13B and 15 thereof being visisble in FIG. 5), and a stationary or non-rotatable member 40.

The first rotatable member 20 has the general shape of an outer barrel 20' which is limited by a first front wall 22, a peripheral portion 23, and a second front wall 24 which is integral with the peripheral portion 23. The first front wall is supported by a hub-shaped central portion 21 and the peripheral portion 23 is by means of fastening bolts 22A secured to the periphery of the first front wall 22.

The second front wall 24 has a central opening 24a from which a hopper-shaped portion 24b extends towards the first front wall 22. Portion 24 is at its other, inner end surrounded by an annular chamber 24C, shown at a larger scale in FIG. 5B).

In the peripheral portion 23 is an annular chamber 23A provided, the bottom 23A' of which is located at a greater radial distance from the central portion 21 than the adjacent parts of the peripheral portion 23. At least one pressure head tube 28 (cfr. FIG. 6), and preferably a plurality of such tubes, secured to the stationary member 40, projects into the chamber 23A, which is entirely open towards the inner space M of the outer barrel 20', and defines a rotable oil reservoir.

The mouthes 28a of the pressure head tubes are turned opposite to the intended rotational direction Y of the device.

Within the outer barrel 20', axially spaced from the two said front walls 22, 24 thereof, and radially spaced from the peripheral portion 23, is an inner barrel 26 provided which has a bottom 26a facing the second front wall 24. The bottom 26a has a central opening 26b which spacedly surrounds the inner end of the hopper-shaped portion 24b with the ring chamber 24c. The inner barrel 26 is entirely open at its end facing the first front wall 22 of the outer barrel 20'.

Within a piston space P, located between the inner face of said first front wall 22, and the adjacent end of said inner barrel 26, is a flat control piston 25 arranged which has an upwardly flared edge portion 25' and a central opening 25a and which is governed by centrifugal pressure.

The control piston 25 carries on its face turned towards the inner barrel 26 a protruding, ring-shaped block 25c, and is in the direction towards the rotational centre line X—X open with an opening 25a (having a diameter of e.g. 150–120 mm).

Within the inner barrel 26 is at least one, and preferably are several (in the example shown eight) outer discs 27 mounted, which define tghe operative elements of the first rotatable member 20 and which are in per se known manner non-rotatably, but axially adjustably arranged, in that they at the outer periphery have protruding abutments which slide in axial grooves 26c in the inner surface of the inner barrel 26.

At the periphery of the control piston 25 is at least one opening 25d, and in a flange 29, by means of which the inner barrel 26 is supported in the outer barrel 20', is at least one passage 29a provided through which the piston space P communicates with the above mentioned space M.

The first rotatable member 20 is by means of its central bore 21a mounted on the output stub shaft 2a of the motor 2, and is non-rotatably connected thereto, e.g. by means of a key joint 5.

The second rotatable member 30 has a hub-shaped central portion 31 which with some spacing surrounds the central portion 21 of the first rotable member, and is supported by this member with the aid of bearings 11a, 11b.

Disposed concentrically around the central portion 31, and connected thereto by means of a bracket 32 having at least one opening 32A, is a ring portion 33 located inside the inner barrel 26. The portion 33 supports at least one, and preferably several (in the example shown seven) inner discs 37, which define the operative elements of the second rotatable member 30. Also the discs 37 are in a manner known per se non-rotatably, but axially adjustably supported by sliding with lugs at their inner periphery in axial grooves 33c in the ring member 33.

The outer and the inner discs 27 and 37 alternate in a disc space B inside the barrel 26. The ring member 33 is at its inner surface provided with an annular chamber 33A which is open towards the interior. The second rotable member 30 is non-slidably and non-rotatably connected to the third rotatable member, i.e. to the elastic axial coupling 13B etc.

The stationary member 40 comprises a hopper-shaped or conical portion which is connected to a central portion 41 and is located within the hopper-shaped portion 24b of the first rotatable member 20 and which, in its turn, surrounds the central portion 31 of the second rotatable member 30 and is mounted thereon. The portion 41 is non-rotatably connected to a rigid tubular casing 16 and to a rigid barrel-shaped hood 17. The connection is made "pivotal" so that no additional journal forces are generated even in the absence of a careful alignment of the stationary member.

The member 40 may be rigidly connected to the casing 16 and/or to the hood 17, which in their turn may be pivotally connected to the base 4 or to any other stationary part of the assembly, e.g. according to FIG. 5a by means of a rigid rod 17A with pivots at each end.

An alternative rotational stop with the same function may be embodied e.g. by an engagement fork 17B affixed to the casing 17, and a bolt 2C protruding from the end face 2' of the motor 2, etc. and engaging, with a slight play, the fork 17B.

Another alternative rotational stop may be defined e.g. by a some what loose steel wire extending between the stationary member 40 and any other stationary part.

The casing 16 and/or the hood 17 may also be rigidly connected to the motor 2, the pump 3 etc., and the stationary member 40 may inside the assembly be connected, in the above described manner, to the casing 16 and/or to the hood 17.

In regard of the manner in which the stationary member 40 has to be journalled, it is to be noted that mounting it by means the central portion 31 on the output stub shaft 2a, as illustrated (or analogically on the input stub shaft 3a), is fully adequate with respect to the support function, so that the rotational stop has only to prevent co-rotation.

In viscohydraulic couplings is torque primarily transmitted through friction in an oil film between the inner and the outer discs 27, 37. The magnitude of the transmitted torque—and thus the speed of the driven machine—is varied, according to the invention, both by varying the mutual spacement of the discs 27, 37, and the degree to which oil is filled in the disc space B (i.e. varying the radius of the circular inner boundary of the annular oil volume which is formed adjacent the inner face of the inner barrel 26 by the effect of centrifugal force).

Both said variations are achieved by varying the oil flow in the device by means of a control valve 58 (FIG. 7, not shown in FIG. 5) located outside the device 10 C.

Oil is admitted both to the disc space B and to the right hand portion P' of the piston space P (FIG. 5). The oil forms in operation, due to the centrifugal force, an oil annulus within the space P', and, when it has been dammed up in the disc space B (whereto it comes through the opening 32A and the piston space P), it also forms annular volumes around the discs 27, 37.

The oil flows from the disc space B via the opening or openings 26d, and from the piston space P' via the opening or openings 25d and the passage or passages 29a in the space M to collect—still due to the centrifugal force—in the chamber 23A. The oil passes through the pressure head tubes 28 in the direction of the arrow C from the chamber 23A to the stationary member 40.

The oil which is discharged from the disc space B flows according to the arrow C in a closed circuit first to the stationary member 40, therefrom in a manner known per se into a secondary closed circle (not shown in FIG. 5, cfr. FIG. 7) comprising a filter, a cooler and the said control valve, and back to the stationary member 40, and therefrom in the direction of the arrow F back into the disck space B.

The oil entering the piston space P' follows the same path from the pressure head tubes 28 and through the secondary closed circuit and then the path denoted by arrows Q from the stationary member 40, via channels in the central portion 31, into the portion P' of the piston space between the control piston 25 and the first front wall 22, and further via the opening (or openings) 25d and the passage (or passages) 29a in the direction of arrows T back into the space M.

A changed degree of illing in the space P' results in an axial adjustment of the control piston 25, resulting in a narrower or wider space between the discs 27, 27, and consequently leads to a reduced or increased slip between the two disc sets.

For speed feedback (strictly for the feedback of the square of the speed) is a circuit provided from the chamber 33A via the channel 41e (FIG. 6) to an outer controller (not shown), e.g. according to SE-C-7605875-9.

According to FIGS. 5 and 6 are to the hub portion 41 of the stationary member three pressure head tubes 28 attached which by means of a collecting channel, not shown, are connected to a channel 41c for further transport of the oil to the outer controller. A stationary oil reservoir 54, which partly surrounds all hub portions, is connected to an outer indicator 54a (FIG. 7) of the oil level in the reservoir, and is vented to the air by means of channels 41b and 41a respectively.

The oil reservoir 54 does not constitute a part of any oil circuit. It has the shape of a part of a circular ring, which allows it to be located inside the device, whereby a reduction of the occupied space is obtained. The oil level in the reservoir 54 communicates with the surroundings, among other things via a channel 41b in the stationary member 40 which leads to an outer device 54A for oil replenishment and oil level indication.

Oil from the reservoir 54 is tapped by means of an oil filling device 140 (FIG. 6a) which is controlled by a bell crank 145, pivotally journalled on the stationary member 40. The first lever 145a of the bell crank extends with a spade-like end portion 145a' into the oil annulus 123A, formed in the chamber 23A during rotation.

The oil filling device 140 comprises two valves. The second lever 145b of the bell crank is pivotally connected to the valve body 141 of a first valve 140A, which body affects a first valve seat 141a. A compression spring 141' maintains the valve open in rest position. The valve body 142 of a second valve 140B, acting against a second valve seat 142a, is connected to a membrane disc 142b.

A membrane 144 divides the inner space of the valve house which defines the oil filling device 140, into two chambers V1 and V2, respectively. The chamber V1 is, via conduits not shown, connected to the pressure head tubes 28 or to the channel 41c (FIG. 6), and the chamber V2 is connected to the oil reservoir 54.

A second compression spring 142' maintains the second valve body 142 in a closed position when there is no pressure in the chamber V1.

With both valves open, oil may flow out from the oil reservoir 54. At normal operational conditions, and counter clock-wise rotation (arrow Y), the resistance from the oil annulus 123A against the end of the lever 145a maintains the first valve closed, whereas pressure from the pressure head tube maintains the other valve open.

If there is no oil in the chamber 23A, the first valve is opened.

The non-rotating hub portion 41 is rotatably mounted on the hub portion 31 in order to take up radial forces. According to the invention, the bearing means is defined by self-adjusting radial block bearings. Bearing blocks 9, 9', 91a-c are each pivotally suspended on an adjustable screw 92a-c with a spherical end face. The block have a bearing surface of a few cm², and are located in recesses in the hub portion 41. Thus space is obtaned for intermediate oil channels. The oil channel system comprises various channels 41a-e which extend in various directions in the central portion 41.

The oil circuitry is shown very diagrammatically in FIG. 7. The oil annuli formed by the rotation are represented by downwardly "open" squares 123A, 100B, 100P and 133A, corresponding to spaces denoted 23A, B, P' and 33A. Full lines represent channels for a closed oil flow and circle-signs stand for open oil flow such as jets, drips etc. Dashed lines represent signal routes.

In the chamber 133A is disposed a measuring pressure head tube 38 which receives a signal value proportional to the square of the speed of the second rotatable member 30. The signal value, which defines an actual value, is as oil pressure passed to a controller 50 where it is compared with an outer control signal defining a set value. The difference between the actual value and the set value is a control deviation which governs a control valve 58 so as to increase or reduce the oil flow.

The controlled oil flow is pased through a filter 63 and a cooler 64 to the stationary member 40 and is distributed therein on the one hand to the disc space B, and on the other hand to the space P' adjacent the control piston 25.

One of the advantages of the embodiment according to FIG. 5 is, that the pressure in the space P' is generated by centrifugal force, which means that the inlet pressure to the stationary member 40 may be very low. Between the stationary member 40 and the second rotatable member 30 is an annular chamber 55 provided into which the oil flowing to the space P' passes via the first rotatable member 20 in open flow. Lateral leaks (arrows 55') from the chamber 55 are lead to the disc space B (not shown in the drawing).

Besides of the illustrated oil circuits there are also circuits with lower flow rates for replenishing oil rings in barrier seals upon start, and for lubricating the roller bearings. When these oil rings are "flooded", excess oil is drained off in the device, primarily to the spaces B and P'.

This drainage is obtained due to the fact that the radial limitation of the barrier seals inwards, i.e. towards (the inner parts of) the device, has a larger diameter then the corresponding limitation outwards; from FIG. 5b is evident that the radius $R_1$ is smaller than the radius $R_2$.

In operation, a rich oil splash and oil mist condition persists in the device, and due to the different speeds of the members, different air pressures exist at the locations of the three shaft seals of the device 10C, at least two of these seals having a rather large diameter Simple slot seals are therefore not sufficient, and the shaft seals are according to the invention embodied by barrier seals with air sealing oil rings. The barrier seal with the largest diameter is defined by the annular chamber 24c at the hopper-shaped portion 24b, into which chamber projects an annular flange 40a with L-shaped profile, which is secured to the central portion 41 of the stationary member 40.

The barrier seal with the smallest diameter, i.e. the inner barrier seal, is embodied by a similar chamber 31a and a similar annular flange 21d, secured to the central portions 31, 21 of the second and of the first rotatable members 30, 20, respectively.

The third (or outer) barrier seal comprises a blade ring 8, secured to the central portion 31. The arrangement of these three barrier seals, which are entirely relieved from oil pressure, is one the reasons that the useful life of the device 10C meets the demands of the process industry.

The comparatively large diameters, which have to be considered when mounting the stationary member, and when radially mounting the first and the second rotatable members on the stationary member (in the example shown, the central portion 31 of the second rotatable member 30 within the central portion 41 of the stationary member 40), cause that as well roller bearings, as entirely encapsulated slide bearings should lead to too high friction.

Therefore, two self adjusting bearings 9, 9' of radial type (FIG. 6) are used, each one comprising three blocs 91a, 91b, 91c and a bearing face of a few cm².

In the central portion 41 are the channels 41a-e located which have been mentioned already in connection with the description of FIG. 7. Besides of the already described channels 41a, 41b and 41e, there are also channels 41c and 41d leading to and from the controller/cooler.

The channels may also be doubled, to permit within the restricted space available (i.e. the wall thickness Z of the central portion 41) transport of oil flows which actually would need a channel with a larger diameter.

At a sudden stop (e.g. due to failure of the electric power) there would not be time enough to drain (via the stationary member) the oil quantity from the device into the oil reservoir 54 (which is intended to compensate for leakage). Therefore, the oil-filled volumes inside the device are advantageously dimensioned so that, when the assembly is installed with its rotational centre line X—X extending horizontally, the oil quantity may be at operational rest received in the lowermost portion of the assembly, beneath the barrier seal 24c, 40a (i.e. beneath the lowermost part of that seal, not shown in FIG. 5).

In vertical disposition (in which case the motor 2 is always located uppermost), the oil may be received in the space provided in the peripheral portion 23 which is limited by the second front wall 24 and the hopper-shaped portion 24b, the level of the barrier seal 24c, 40a defining then the highest permissible oil level.

A device according to the invention for 55 kW at 1470 r.p.m. may, using an elastic shaft coupling 13, 15 of the "spacer"-type, without difficulties be built in a size which is evident from the millimeter scale in FIG. 5, having a total axial length L of the portions accomodated within the hood 17 of 135 mm, which permits mounting on an electric motor according to the IEC standard, which has an output stub shaft 2a 140 mm long.

The length LS of the gap G (FIG. 2) remains unchanged, i.e. that the possibility to disassemble the pump or the motor is retained.

The fit between the output stub shaft 2a and the opening 21a in the central portion 21 is comparatively tight, and therefore is the first front wall 22 of the first rotatable member 20 provided with a mounting bore 18, by which may be closed by a plug which works against an internal, temporarily compressed, split ring (not shown) on the output stub shaft 2a. In the last phase of mounting, a threaded bore 2a' in the free end of the output stub shaft 2a is used.

For disassembly, withdrawal tools are used, screwed at 19a on the outer end of an extension sleeve 33 which is loosely slipped on the output stub shaft 2a and at its inner end is screwed to the central portion 21 of the first rotable member 20.

In FIG. 8 is shown a device 10D in which the first rotable member 20' carries inner discs 27', and the second rotable member 30' carries outer discs 37'. Instead of the two bearings 11a, 11b of the device 10C according to FIG. 5, a single bearing 11' between the central portions 21', 31' of the two rotatable members 20', 30 is used for the radial mounting.

This bearing 11', shown more in detail in FIG. 9, is of the so called four-point-contact type with ball races 11'a, 11'b, 11'c, ground in such a manner that the bearing balls 11'e rest against them at four separate locations, so that the bearing fills the function of two bearings located spacedly from each other at $U_1$, $U_2$.

The stationary member 40 is in the embodiment of FIG. 8 provided with a plurality of pressure head tubes 28' which extend in the chamber 23a. A plurality of pressure head tubes are used, the same as in the device according to FIG. 6, in order to reduce the axial length of the whole device.

At the end of the stub shaft 2a is a thin plate 39 provided which is secured to the second rotable portion 30' in order to prevent oil leakage. The axial adjustment of the discs 27', 37' is achieved with the aid of a control piston 25' which is provided with a membrane, and to which pressurized oil is fed from the stationary member 40.

The passage 29a of FIG. 5 is in this instance embodied by an axial annular slot 29a' with small clearance. A device of the type 10D in the size indicated by the millimeter scale is able to transmit 22 kW at 1470 r.p.m.

In FIGS. 10A and 10B are very diagramatically shown two ways in which the first rotatable member 20 and the second rotatable member 30 may be, together with the stationary member 40, arranged within a device according to the invention. The arrangement according to FIG. 8 corresponds to the diagram 10A, and the arrangement according to FIG. 5 corresponds to the diagram 10B.

From the diagrams 10A and 10B is evident that the second rotatable member 30 may be journalled as well on the first rotatable member 20 (which is the case in FIGS. 5 and 7), as directly on the output stub shaft 2a (in which case either will be the central portion 21 extended to the free end of the stub shaft 2a, or the central portion 31 will be displaced to abut with that stub shaft).

One of the characterizing features of the invention is, as shown in the embodiment according to FIGS. 5 and 8, that the rotatable members are journalled one upon the other, so as to take up radial forces (among other), and a compact design is achieved by the members being telescoped one into the other, and preferably journalled at their central parts.

To facilitate mounting afterwards, the device according to the invention is advantageously designed so as to have one or two separation surfaces, extending transversely to the rotational centre line, and situated in the area of the free end of one or both of the stub shafts. By the term "separation surface" is understood a hypothetic surface, particularly a plane one, along which the device may be readily assembled and disassembled into two or three parts in axial direction.

Advantageously, the separation surface is located so that the more complicated and delicate inner parts of the device form a compact and sturdy unit, which, among other things, is protected against contamination at the erection site of an assembly. In FIGS. 11A and 11B are shown two alternatives how a separation surface U may be localized in a device 10 according to the invention mounted in an assembly with a narrow gap G.

The axial length L of the device is limited by the respective separation surface, the exact position of which in its turn depends on the design of the shaft coupling. In a conventional, non elastic shaft coupling 19 having a central opening 19', the separation surface will extend along the flange 19a by which the coupling, with the aid of screws, is connected to the assembly 10.

In the elastic coupling 13 is the separation surface U defined by the plane, along which the coupling may be disassembled.

As has been mentioned at the outset, there also exist motor-pump-assemblies, in which the gap G' between the output and input stub shafts, in order to facilitate disassembly, is in the order of 100-200 mm, and is bridged by a "spacer", which is e.g. embodied by a tube. In such a case may, according to FIGS. 12A-12D, a unit 10 or 10' according to the invention be arranged in this gap G' with a length LS' (FIG. 12D), and be connected to one of the stub shafts 2a, 3a by means of an elastic shaft coupling 13, 13A which is slipped on that stub shaft, while being rigidly connected to the other stub shaft by means of a conventional, rigid coupling 19.

It will be understood that in practice it is irrelevant to which one of the two stub shafts the connection is made elastic, and to which one rigid. It is also possible according to FIG. 12B to establish the connection to both of the stub shafts 2a, 3a by means of elastic shaft couplings 13A, 13B.

Figure 12A:
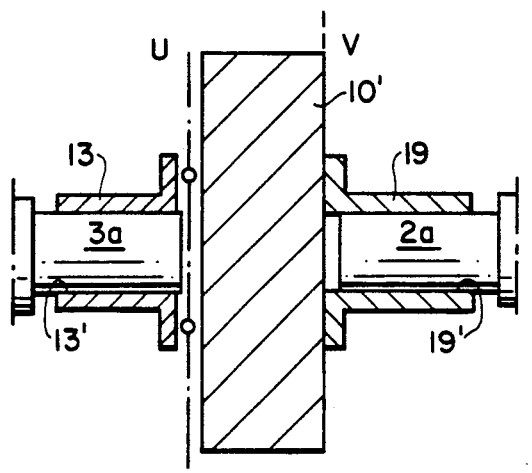
Figure 12B:
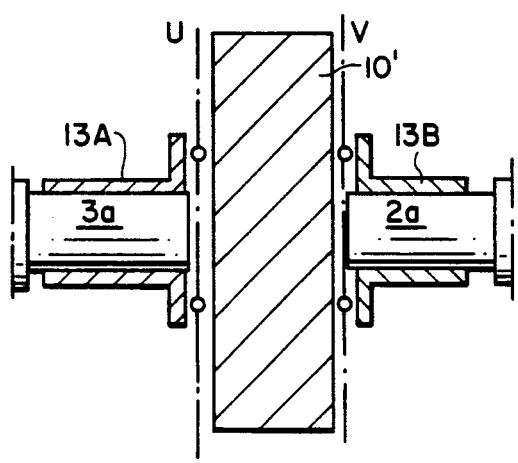
Figure 12C:
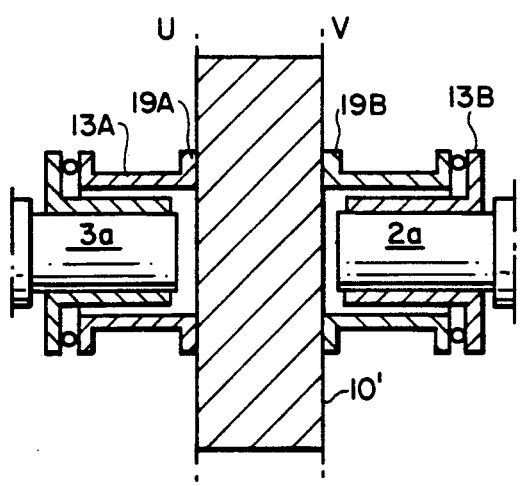
Figure 12D:
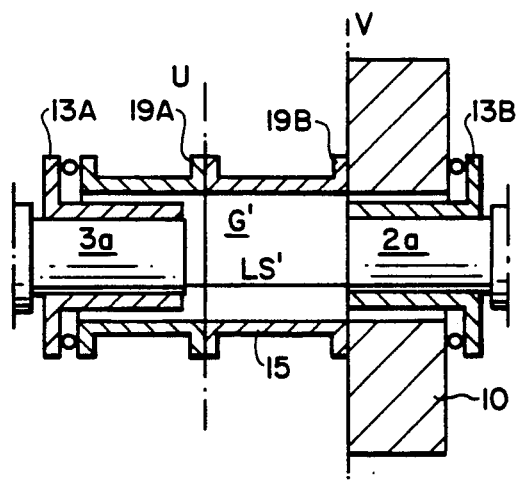
Figure 4:
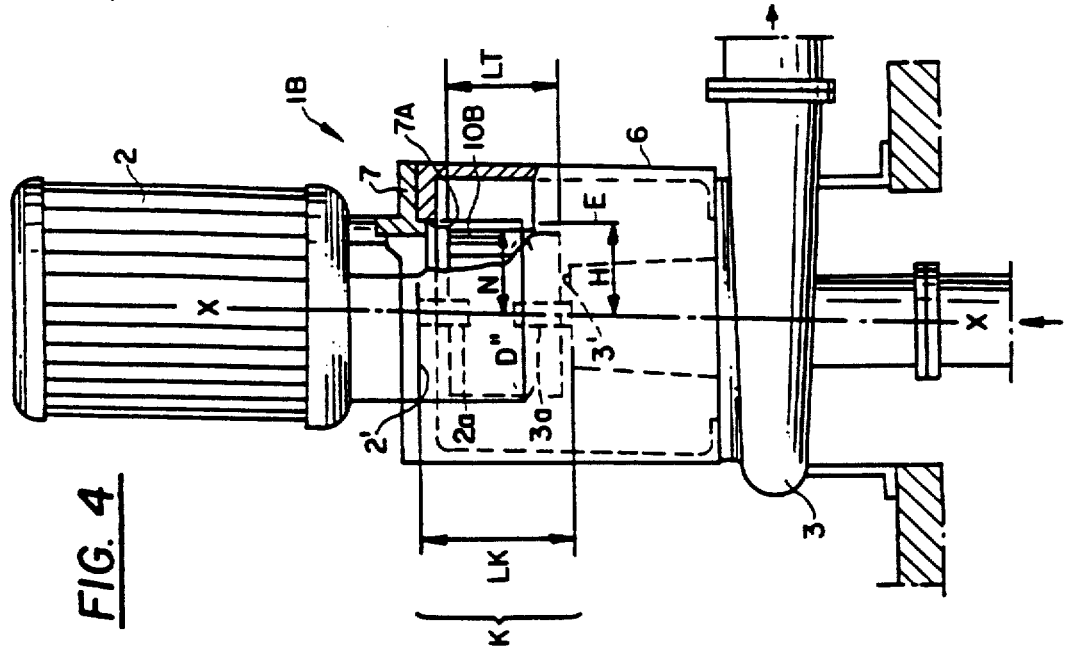
Figure 3:
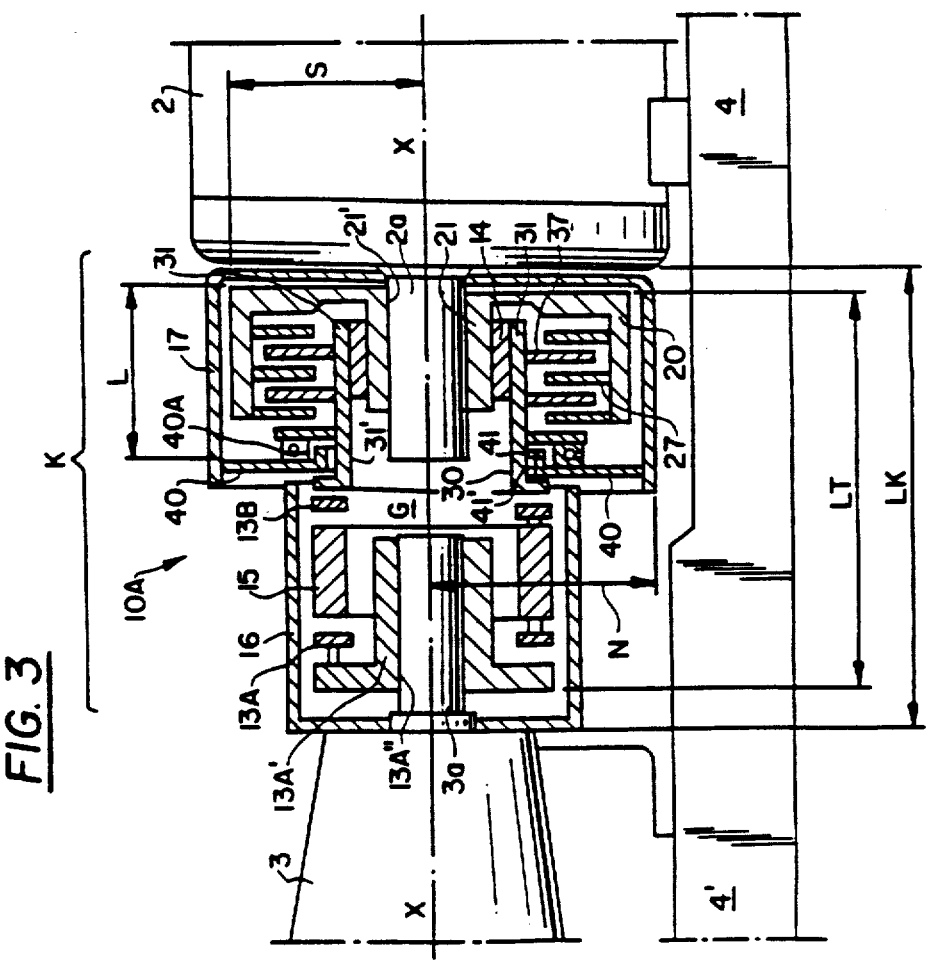
Figure 5B:
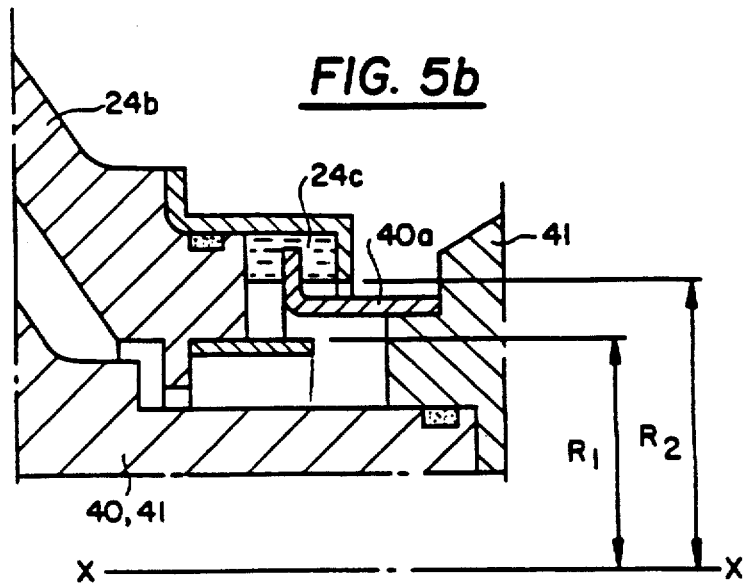
Figure 5A:
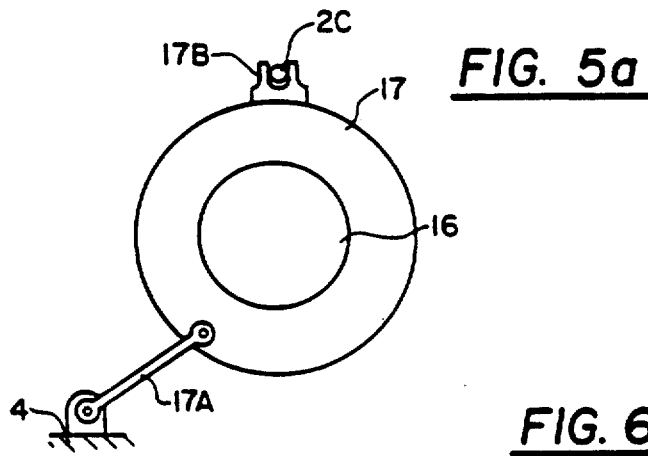
Figure 6A:
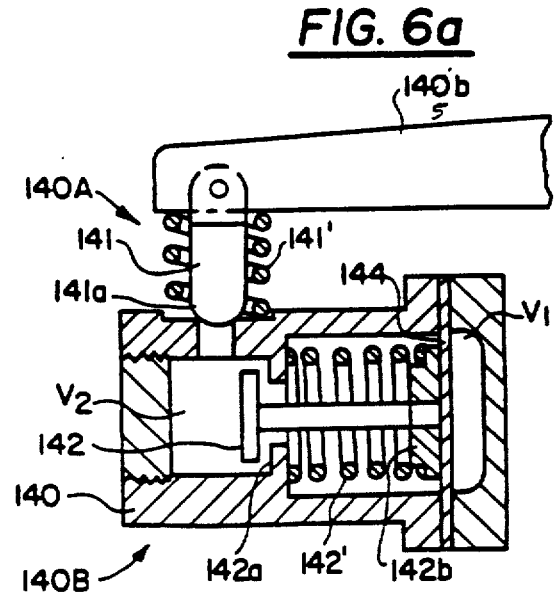
Figure 7:
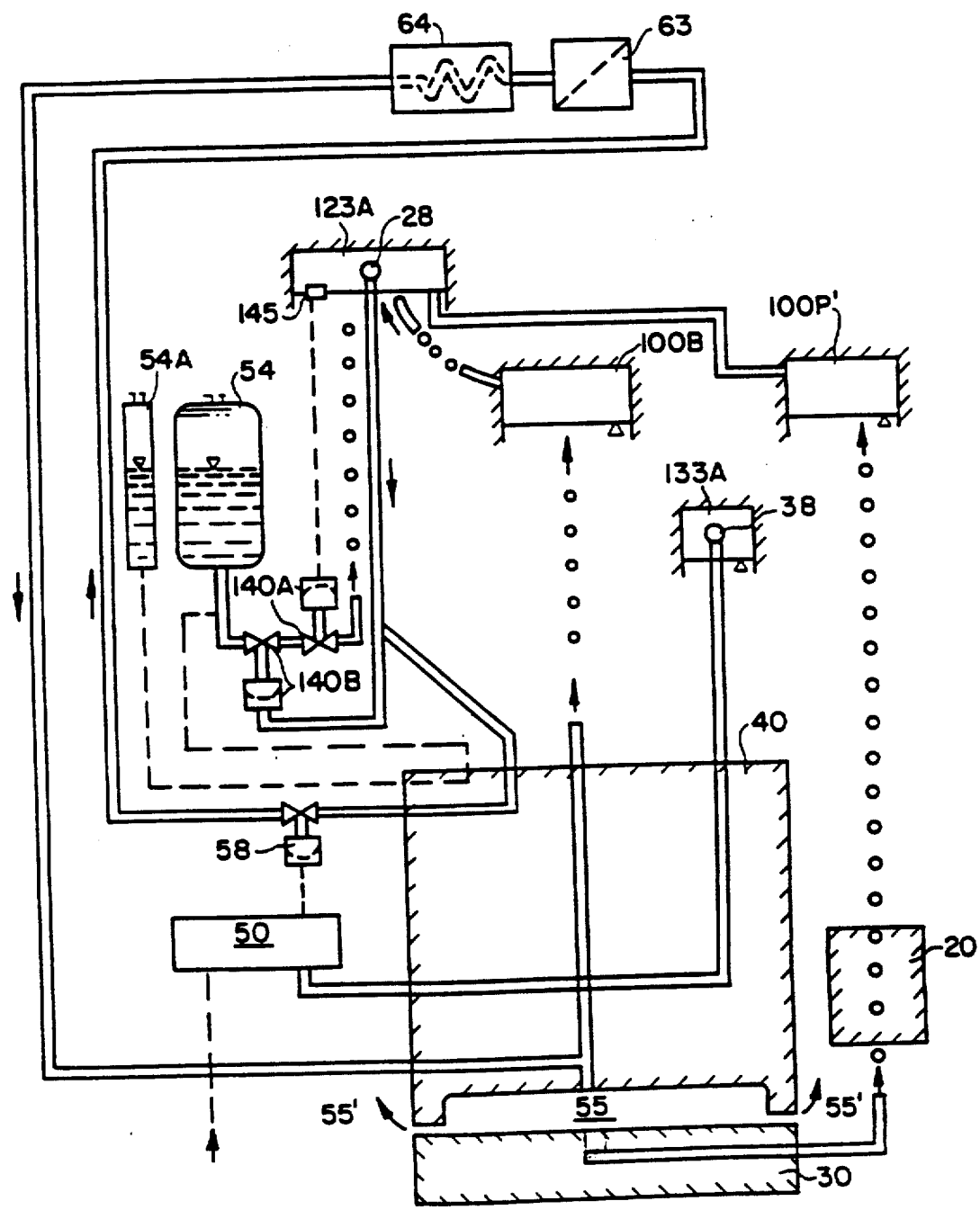
Figure 8:
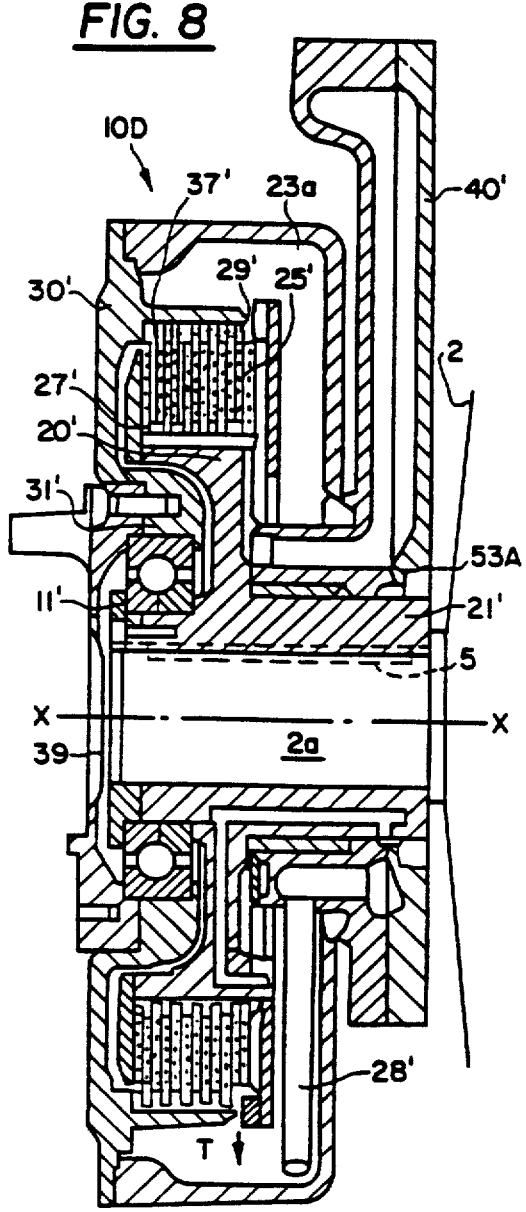
Figure 9:
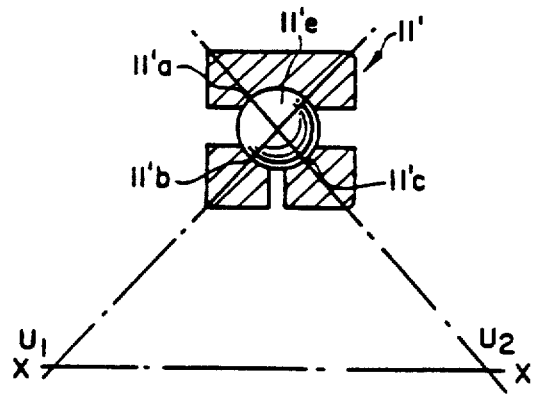
Figure 12A:
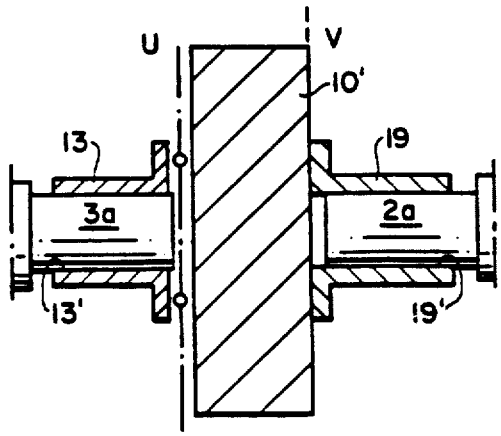
Figure 12B:
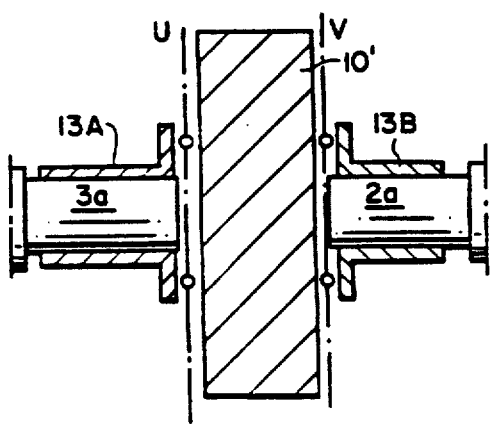
Figure 12C:
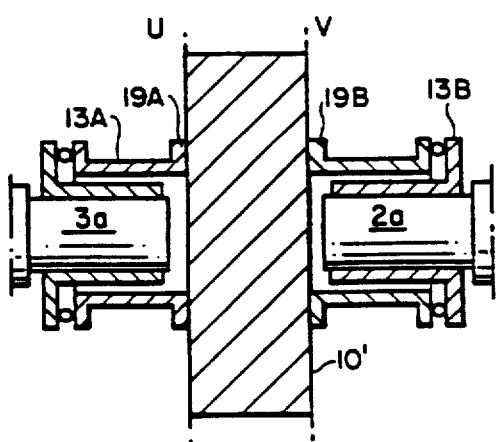
Figure 12D:
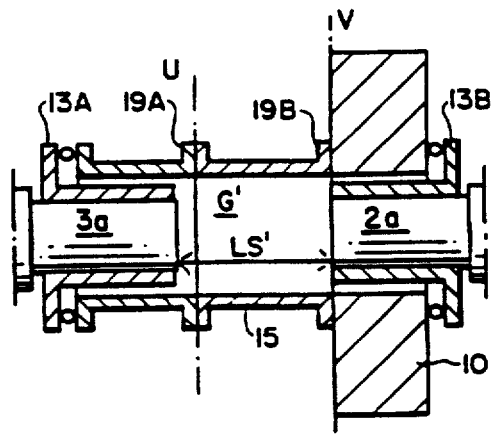

In FIGS. 12C and 12D is shown a mounting by means of a combination of two elastic couplings 13A, 13B and two non-elastic couplings 19A, 19B, and in FIG. 12D is shown a still further combination with a "spacer" element 15.

Two separation surfaces U, V are available in the embodiments of FIGS. 12A-12D. The unit 10' according to these figures does not need to have any central opening, since it is the central openings 13', 13A', 13B', 19' of the shaft couplings 13, 13A, 13B, 19 which define the connection openings of the device.

We claim:

1. A device for connecting an electric motor, rotatable with at least nearly constant rotational speed, with a pump forming with the motor an assembly in which two parts are spaced one from another, in particular as prescribed by standards, said motor having a housing with an end face from which with a given free length projects an output stub shaft, and said pump having an end face turned towards the said end face of the motor, and from which with a given free length, and essentially co-axially with the said output stub shaft, projects an input stub shaft, the adjacent free ends of the two stub shafts being separated by a gap with a given axial length, and the device being embodied by a stepless, continuously operable speed controller, comprising in combination

- aa) a first rotatable member adapted for non-rotary connection to said output stub shaft and carrying at least one operative element in the form of a troque transmission disc;
- ab) a second rotatable member adapted for non-rotary connection to said input stub shaft and carrying at least one operative element in the form of a torque transmission disc cooperating with the said operative element of the first rotatable member;
- ac) at least one third rotatable member located between two of the first rotatable member, the second rotatable member, and the corresponding stub shaft and which defines an elastic shaft coupling means;
- ad) a stationary member carrying in- and output connections for a cooling medium for dissipating heat generated inside the device, and a connection for an outer speed control signal affecting the rotatable members so as to induce a change of speed, and
- ae) variation means for varying the torque primarily transmitted through friction between the torque transmission discs, resulting in a variation of speed;
- af) said variation means being controlled by a speed control signal fed from the stationary member so as to induce a change of speed,
- ag) the stationary member being with the aid of bearing means mounted on, and journalled to, at least one of the said rotatable members so as to take up radial forces, a rotational stop permitting limited rotation of the stationary member being provided to prevent more extensive co-rotation therewith;
- b) said controller, in order to be installable between the said two end faces spaced one from another without regard to a speed control device, being with limited radial and axial extent constructed as a unit comprising two of the rotatable members and the stationary member;
- ba) the said rotatable members extending in radial direction maximally to a cylindrical reference surface which is coaxial with the stub shafts and is tangent to a limit point which is relevant for the space adjacent the respective stub shafts;
- bb) the stationary member extending in the respective direction maximally to said reference surface;
- bc) the axial length of all rotatable parts of the unit, inclusive of pertaining shaft coupling means, not exceeding by more than 5% a free length of each one of the stub shafts increased by 10%, or a length of the gap, whichever is the largest;
- c) the speed controller having at least one central connection opening, by which it is mountable on at least one of said stub shafts;
- d) the stationary member, and at least two of the said rotatable members having a central portion with a central opening, the central opening of at least one of the rotatable members embodying said at least one connection opening by means of which the central portion of the respective rotatable member is non-rotatably mountable on the respective stub shaft;
- e) in at least three of at least four parts provided with a central portion being their other portions situated radially around the central portion, and
- f) the first and the second rotatable members being mounted one on another with the aid of bearing means and so as to take up radial forces and at the same time allow rotation with different speeds.

2. A device as claimed in claim 1, wherein, a rotatable means of protection (21', 20, 22, 24, 30', 39) for the operative elements and for the bearing means is provided, and wherein the device, in order to facilitate a partial disassembly thereof, is separable along at least one separation surface (U, V) extending adjacent the free end of a stub shaft transversely to a longitudinal centre line of the stub shaft.

3. A device as claimed in claim 1, wherein at least some of the central portions of the first and the second rotatable members and of the stationary member are all with the aid of bearing means telescoped one into another, and at least some of the said other portions, which carry the operative elements and are disposed radially around the central portions, are telescoped or entirely accommodated one into another.

4. A device as claimed in claim 3, wherein the first and the second rotatable members are mounted with their central portions one upon the other.

5. A device as claimed in claim 3, wherein the central portion of the second rotatable member is rotatably mounted relative to the stub shaft on which the central portion of the first rotatable member is non-rotatably mounted.

6. A device as claimed in claim 1, wherein outer operative elements (27) are carried by the first rotatable member (20) and surround inner operative elements (37) which are carried by the second rotatable member (30).

7. A device as claimed in claim 1, wherein outer operative elements (27) are carried by the second rotatable member (30) and surround inner operative elements (37) which are carried by the first rotatable member (20).

8. A device as claimed in claim 1, wherein the bearing means (11') between the first and the second rotatable member is defined by a single bearing (11') of a four point contact type with ball races (11'a, 11'b, 11'c) attached so that the bearing has a journalling function corresponding to that of two bearings spaced apart.

9. A device for connecting an electric motor, rotating with at least nearly constant rotational speed, with a pump forming with the motor an assembly in which two parts are spaced one from another, in particular as prescribed by standards, said motor having a housing with an end face from which with a given free length projects an output stub shaft, and said pump having an end face turned towards the said end face of the motor, and from which with a given free length, and essentially co-axially with the said output stub shaft, projects an input stub shaft, the adjacent free ends of the two stub shafts being separated by a gap with a given axial length, and the device being embodied by a stepless, continuously operable speed controller being a viscohydraulic coupling, comprising in combination aa) a first rotatable member for non-rotary connection to said output stub shaft and carrying at least one operative element in the form of a torque transmission disc;

ab) a second rotatable member for non-rotary connection to said input stub shaft and carrying at least one operative element in the form of a torque transmission disc cooperating with the said first rotatable member;

ac) at least one third rotatable member located between two of the first rotatable member, the second rotatable member and the corresponding stub shaft and which defines an elastic shaft coupling means; and ad) a stationary member carrying in- and output connections for a cooling medium for dissipating heat generated inside the device, and a connection for an outer speed control signal affecting the rotatable members so as to induce a change of speed;

ae) said discs being mounted with variable mutual spacement, and between which a torque-transmitting lubricating fluid film is sustained, and further comprising a closed circuit for the lubricating fluid from which said film is formed, said circuit comprising a pumping means, a variation means for varying the lubricating fluid flow, and a cooler;

af) the stationary member being with the aid of bearing means mounted on, and journalled to, at least one of the said rotatable members so as to take up radial forces, a rotational stop permitting limited rotation of the stationary member being provided to prevent more extensive co-rotation with the carrier member;

b) said controller, in order to be installable between the said two end faces spaced one from another without regard to a speed control device, being with limited radial and axial extent constructed as a unit comprising two of the rotatable members and the stationary member;

ba) the said rotatable members extending in radial direction maximally to a cylindrical reference surface which is coaxial with the stub shafts and is tangent to a limit point which is relevant for the space adjacent the respective stub shaft;

bb) the axial length of all rotatable parts of the unit, inclusive of pertaining shaft coupling means, not exceeding by more than 5% a free length of each one of the stub shafts increased by 10%, or a length of the gap, whichever is the largest;

c) the speed controller having at least one central connection opening, by which it is mountable on at least one of said stub shafts;

d) the stationary member, and at least two of the said rotatable members having a central portion with a central opening, the central opening of at least one of the rotatable members embodying said at least one connection opening by means of which the central portion of the respective rotatable member is non-rotatably mountable on the respective stub shaft;

e) in at least three of at least four parts provided with a central portion their other portions situated radially around the central portion; and f) the first and the second rotatable members being mounted one on another with the aid of bearing means and so as to take up radial forces and at the same time allow rotation with different speeds.

10. A device as claimed in claim 9, wherein a rotatable means of protection for the operative elements and for the bearing means is provided, and wherein the device, in order to facilitate a partial disassembly thereof, is separable along at least one separation surface extending adjacent the free end of a stub shaft transversely to a longitudinal center line of the stub shaft.

11. A device as claimed in claim 9, wherein the bearing means between the first and the second rotatable member is defined by a single bearing of a four point contact type with bail races adapted so that the bearing has a journalling function corresponding to that of two bearing spaced apart.

12. A device as claimed in claim 9, wherein outer operative elements are carried by the first rotatable member and surround inner operative elements which are carried by the second rotatable member.

13. A device as claimed in claim 9, wherein at least outer operative elements are carried by the second rotatable member and surround inner operative elements which are carried by the first rotatable member.

14. A device as claimed in claim 9, in which the said variation means is embodied by a control piston (25) with an inner face turned toward the operative elements and an outer face turned in an opposite direction, wherein the control piston opens toward the inner space of the device and is provided with an oil outlet (25d), the speed controlling action being achieved solely by variation of the amount of oil which is fed to the outer face of the control piston, where, due to centrifugal force, a rotating oil annulus with a thickness and radius varying in dependence of the oil feed is formed.

15. A device as claimed in claim 12, wherein a stationary oil reservoir (54) is provided for the compensation of leakage, which reservoir is adapted to be controlled, with the aid of an oil filling device (140), by an amount of oil in the said rotatably oil reservoir (23a).

16. A device as claimed in claim 12, wherein sealing elements are provided between the stationary member of the device and the rotatable members thereof, and inner spaces of the device are so dimensioned, that an oil quantity which during operation circulates in the device in operation may at rest be accommodated beneath sealing elements, irrespective of the rotational axis extending horizontally or vertically, in the last mentioned case provided that the motor is in conventional manner located on top of the assembly.

17. A device as claimed in claim 16, wherein at least some of the sealing elements are embodied by barrier seals, comprising an annular groove which has a trough-shaped cross-section.

18. A device as claimed in claim 17, wherein the barrier seals have in cross-section a lower limitation towards the center of the device than in the opposite direction.

19. A device for connecting an electric motor, rotatable with at least nearly constant rotational speed, with a pump forming with the motor an assembly in which two parts are spaced one from another, in particular as prescribed by standards, said motor having a housing with an end face from which with a given free length projects an output stub shaft, and said pump having an end face turned towards the said end face of the motor, and from which with a given free length, and essentially co-axially with the said output stub shaft, projects an input stub shaft, the adjacent free ends of the two stub shafts being separated by a gap with a given axial length, and the device being embodied by a stepless, continuously operable speed controller, comprising in combination aa) a first rotatable member for non-rotary connection to said output stub shaft and carrying at least one operative element in the form of a torque transmission disc;

ab) a second rotatable member for non-rotary connection to said input stub shaft and carrying at least one operative element in the form of a torque transmission disc cooperating with the said operative element of the first rotatable member;

ac) at least one third rotatable member located between two of the first rotatable member, the second rotatable member and the corresponding stub shaft and which defines an elastic shaft coupling means;

ad) a stationary member carrying in- and output connections for a cooling medium for dissipating heat generated inside the device, and a connection for an outer speed control signal affecting the rotatable members so as to induce a change of speed; and ae) variation means for varying the mutual spacement of said discs or for varying the degree (radius) to which lubricating fluid is comprised between said discs, resulting in a variation of speed;

ae') a rotatable lubricating fluid reservoir in the first rotatable member;

ae") at least one stationary pump means such as a pressure head tube projecting into the said reservoir and connected to the central portion of the stationary member;

af) said variation means being controlled by a speed control signal fed from the stationary member so as to induce a change of speed, ag) the stationary member being with the aid of bearing means mounted on, and journaled to, at least one of the said rotatable members so as to take up radial forces, a rotational stop permitting limited rotation of the stationary member being provided to prevent more extensive co-rotation with the carrier member;

b) said controller, in order to be installable between the said two end faces spaced one from another without regard to a speed control device, being with the limited radial and axial extent constructed as a unit comprising two of the rotatable members and the stationary member;

ba) the said rotatable members extending in radial direction maximally to a cylindrical reference surface which is coaxial with the stub shafts and is tangent to a limit point which is relevant for the space adjacent the respective stub shaft;

bb) the axial length of all rotatable parts of the unit, inclusive of pertaining shaft coupling means, not exceeding by more than 5% a free length of each one of the stub shafts increased by 10%, or a length of the gap, whichever is the largest;

c) the speed controller having at least one central connection opening, by which it is mountable on at least one of said stub shafts;

d) the stationary member, and at least two of the said rotatable members having a central portion with a central opening, the central opening of at least one of the rotatable members embodying said at least one connection opening by means of which the central portion of the respective rotatable member is non-rotatably mountable on the respective stub shaft;

e) in at least three of at least four parts provided with a central portion there being other portions situated radially around the central portion, and f) the first and the second rotatable members being mounted one on another with the aid of bearing means and so as to take up radial forces and at the same time allow rotation with different speeds.

20. A device as claimed in claim 19, wherein, a rotatable means of protection for the operative elements and for the bearing means is provided, and wherein the device, in order to facilitate a partial disassembly thereof, is separable along at least one separation surface extending adjacent the free end of a stub shaft transversely to a longitudinal center line of the stub shaft.

21. A device as claimed in claim 19, wherein the bearing means between the first and the second rotatable member is defined by a single bearing of a four point contact type with bail races adapted so that the bearing has a journalling function coresponding to that of two bearing spaced apart.

22. A device as claimed in claim 20, wherein the rotatable members of the stepless and continuous speed controller have a radial extent (S) which does not exceed five times the diameter of the connection opening of the thickest stub shaft, and their axial dimension (L), multiplied by their radial dimension (S), does not exceed twelve times the square of the said diameter.

23. A device as claimed in claim 20, wherein the bearing means for the stationary member (40) are defined by self-adjusting radial block bearings (9, 9'), each comprising three blocks (91a–c).

24. A device for connecting an electric motor, rotating with at least nearly constant rotational speed, with a pump forming with the motor an assembly in which two parts are spaced one from another, in particular as prescribed by standards, said motor having a housing with an end face from which with a given free length projects an output stub shaft, and said pump having an end face turned towards the said end face of the motor, and from which with a given free length, and essentially co-axially with the said output stub shaft, projects an input stub shaft, the adjacent free ends of the two stub shafts being separated by a gap with a given axial length, and the device being embodied by a stepless, continuously operable speed controller, comprising in combination aa) a first rotatable member for non-rotary connection to said output stub shaft and carrying at least one operative element in the form of a torque transmission disc;

ab) a second rotatable member for non-rotary connection to said input stub shaft and carrying at least one operative element in the form of a torque transmission disc cooperating with the said operative element of the first rotatable member;

ac) at least one third rotatable member located between two of the first rotatable member, the second rotatable member and the corresponding stub shaft and which defines an elastic shaft coupling means;

ad) a stationary member carrying in- and output connections for a cooling medium for dissipating heat generated inside the device, and a connection for an outer speed control signal affecting the rotatable members so as to induce a change of speed; and ae) variation means for varying the torque primarily transmitted through friction between the torque transmission discs, resulting in a variation of speed;

af) said variation means being controlled by a speed control signal fed from the stationary member so as to induce a change of speed, ag) the stationary member being with the aid of bearing means mounted on, and journalled to, at least one of the said rotatable members so as to take up radial forces, a rotational stop permitting limited rotation of the stationary member being provided to prevent more extensive co-rotation therewith;

b) said controller, in order to be installable between the said two end faces spaced one from another without regard to a speed control device, being with limited radial and axial extent constructed as a unit comprising two of the rotatable members and the stationary member;

ba) the said rotatable members extending in radial direction maximally to a cylindrical reference surface which is coaxial with the stub shafts and is tangent to a limit point which is relevant for the space adjacent the respective stub shaft;

bb) the axial length of all rotatable parts of the unit, inclusive of pertaining shaft coupling means, not exceeding by more than 5% a free length of each one of the stub shafts increased by 10%, or a length of the gap, whichever is the largest;

c) the speed controller having at least one central connection opening, by which it is mountable on at least one of said stub shafts;

d) the stationary member, and at least two of the said rotatable members having a central portion with a central opening, the central opening of at least one of the rotatable members embodying said at least one connection opening by means of which the central portion of the respective rotatable member is non-rotatably mountable on the respective stub shaft;

e) in at least three of at least four parts provided with a central portion there being other portions situated radially around the central portion, f) the first and the second rotatable members being mounted one on another with the aid of bearing means and so as to take up radial forces and at the same time allow rotation with different speeds, and g) a plurality of channels are provided in the central portion of the stationary member approximately along one common circular path.

25. A device as claimed in claim 24, wherein at least some of the central portions of the first and the second rotatable members and of the stationary member are all with the aid of bearing means telescoped one into another, and at least some of the said other portions, which carry the operative elements and are disposed radially around the central portions, are telescoped or entirely accommodated one into another.

26. A device as claimed in claim 24, further comprising means for feeding back the speed value or the square value of the speed value to a controller and which means is provided with a measuring pressure head tube located in an annular channel opening towards an interior of the second rotatable member, said pressure head tube being connected to one of said channels.

27. A device for connecting an electric motor, rotatable with at least nearly constant rotational speed, with a pump forming with the motor an assembly in which two parts are spaced one from another, in particular as prescribed by standards, said motor having a housing with an end face from which with a given free length projects an output stub shaft, and said pump having an end face turned towards the said end face of the motor, and from which with a given free length, and essentially co-axially with the said output stub shaft, projects an input stub shaft, the adjacent free ends of the two stub shafts being separated by a gap with a given axial length, and the device being embodied by a stepless, continuously operable speed controller, comprising in combination aa) a first rotatable member for non-rotary connection to said output stub shaft and carrying at least one operative element in the form of a torque transmission disc;

ab) a second rotatable member for non-rotary connection to said input stub shaft and carrying at least one operative element in the form of a torque transmission disc cooperating with the said operative element of the first rotatable member;

ac) at least one third rotatable member located between two of the first rotatable member, the second rotatable member and the corresponding stub shaft and which defines an elastic shaft coupling means;

ad) a stationary member carrying in- and output connections for a cooling medium for dissipating heat generated inside the device, and a connection for an outer speed control signal affecting the rotatable members so as to induce a change of speed; and ae) variation means for varying the torque primarily transmitted through friction between the torque transmission discs, resulting in a variation of speed;

af) said variation means being controlled by a speed control signal fed from the stationary member so as to induce a change of speed, ag) the stationary member being with the aid of bearing means mounted on, and journalled to, at least one of the said rotatable members so as to take up radial forces, a rotational stop permitting limited rotation of the stationary member being provided to prevent more extensive co-rotation therewith;

b) said controller, in order to be installable between the said two end faces spaced one from another without regard to a speed control device, being with limited radial and axial extent constructed as a unit comprising two of the rotatable members and the stationary member;

ba) the said rotatable members extending in radial direction maximally to a cylindrical reference surface which is coaxial with the stub shafts and is tangent to a limit point which is relevant for the space adjacent the respective stub shaft;

bb) the axial length of all rotatable parts of the unit, inclusive of pertaining shaft coupling means, not exceeding by more than 5% a free length of each one of the stub shafts increased by 10%, or a length of the gap, whichever is the largest;

c) the speed controller having at least one central connection opening, by which it is mountable on at least one of said stub shafts;

d) the stationary member, and at least two of the said rotatable members having a central portion with a central opening, the central opening of at least one of the rotatable members embodying said at least one connection opening by means of which the central portion of the respective rotatable member is non-rotatably mountable on the respective stub shaft;

e) in at least three of at least four parts provided with a central portion there being other portions situated radially around the central portion, f) the first and the second rotatable members being mounted one on another with the aid of bearing means and so as to take up radial forces and at the same time allow rotation with different speeds; and g) a speed controller comprising inner and outer operative elements defined by discs and further comprising a closed circuit pumping means for varying a lubricating fluid flow and a cooler.

28. A device for connecting an electric motor, rotatable with at least nearly constant rotational speed, with a pump forming with the motor an assembly in which two parts are spaced one from another, in particular as prescribed by standards, said motor having a housing with an end face from which with a given free length projects an output stub shaft, and said pump having an end face turned towards the said end face of the motor, and from which with a given free length, and essentially co-axially with the said output stub shaft, projects an input stub shaft, the adjacent free ends of the two stub shafts being separated by a gap with a given axial length, and the device being embodied by a stepless, continuously operable speed controller, comprising in combination aa) a first rotatable member for non-rotary connection to said output stub shaft and carrying at least one operative element in the form of a torque transmission disc;

ab) a second rotatable member for non-rotary connection to said inlput stub shaft and carrying at least one operative element in the form of a torque transmission disc cooperating with the said operative element of the first rotatable member;

ac) at least one third rotatable member located between two of the first rotatable member, the second rotatable member and the corresponding stub shaft and which defines an elastic shaft coupling means;

ad) a stationary member carrying in- and output connections for a cooling medium for dissipating heat generated inside the device, and a connection for an outer speed control signal affecting the rotatable members so as to induce a change of speed; and ae) variation means for varying the torque primarily transmitted through friction between the torque transmission discs, resulting in a variation of speed;

af) said variation means being controlled by a speed control signal fed from the stationary member so as to induce a change of speed, ag) the stationary member being with the aid of bearing means mounted on, and journalled to, at least one of the said rotatable members so as to take up radial forces, a rotational stop permitting limited rotation of the stationary member being provided to prevent more extensive co-rotation therewith;

b) said controller, in order to be installable between the said two end faces spaced one from another without regard to a speed control device, being with limited radial and axial extent constructed as a unit comprising two of the rotatable members and the stationary member;

ba) the said rotatable members extending in radial direction maximally to a cylindrical reference surface which is coaxial with the stub shafts and is tangent to a limit point which is relevant for the space adjacent the respective stub shaft;

bb) the axial length of all rotatable parts of the unit, inclusive of pertaining shaft coupling means, not exceeding by more than 5% a free length of each one of the stub shafts increased by 10%, or a length of the gap, whichever is the largest;

c) the speed controller having at least one central connection opening, by which it is mountable on at least one of said stub shafts;

d) the stationary member, and at least two of the said rotatable members having a central portion with a central opening, the central opening of at least one of the rotatable members embodying said at least one connection opening by means of which the central portion of the respective rotatable member is non-rotatably mountable on the respective stub shaft;

e) in at least three of at least four parts provided with a central portion there being other portions situated radially around the central portion, f) the first and the second rotatable members being mounted one on another with the aid of bearing means and so as to take up radial forces and at the same time allow rotation with different speeds; and g) a stationary pump means projecting into a lubricating fluid reservoir which pumping means is connected to the central portion of a stationary member.

* * * * *

UNITED STATES PATENT AND TRADEMARK OFFICE
CERTIFICATE OF CORRECTION

PATENT NO. : 5,119,923

DATED : June 9, 1992

INVENTOR(S) : Jonsson et al

It is certified that error appears in the above-identified patent and that said Letters Patent is hereby corrected as shown below:

In the drawings, sheets 2, 4, 6, 7 and 9, should be deleted to be replaced with the sheets of drawings as shown on the attached pages.

UNITED STATES PATENT AND TRADEMARK OFFICE
CERTIFICATE OF CORRECTION

PATENT NO. : 5,119,923

DATED : June 9, 1992

INVENTOR(S) : Jonsson et al.

It is certified that error appears in the above-identified patent and that said Letters Patent is hereby corrected as shown below:

Column 1, line 18, "r.p." should be --r.p.m.--.

line 45, "pumps are" should be --pump is--.

line 53, "few tenths millimeters" should be --few tens millimeters--.

Column 6, line 22, "rotable" should be --rotatable--.

line 48, "tghe" should be --the--.

line 66, "rotable" should be --rotatable--.

Column 7, line 55, "is torque" should be --torque is--.

Column 8, line 32, "illing" should be --filling--.

Column 9, line 28, "block" to --blocks--.

line 59, "rotable" should be --rotatable--.

UNITED STATES PATENT AND TRADEMARK OFFICE
CERTIFICATE OF CORRECTION

PATENT NO. : 5,119,923

DATED : June 9, 1992

INVENTOR(S) : Jonsson et al.

It is certified that error appears in the above-identified patent and that said Letters Patent is hereby corrected as shown below:

Column 11, line 25, the number "33" should be deleted.

line 30, "rotable" should be --rotatable--.

Column 13, line 22, "troque" should be --torque--.

Column 14, line 60, "rotating" should be --rotatable--.

Column 15, lines 39-40, "the carrier member" should be --the said stationary carrier member--.

Column 17, line 44, "journaled" should be --journalled--.

line 53, "the limited radial" should be --a limited radial--.

Column 18, line 29, "coresponding" should be --corresponding--.

lines 42-43, "rotating" should be --rotatable--.

UNITED STATES PATENT AND TRADEMARK OFFICE
CERTIFICATE OF CORRECTION

PATENT NO.  : 5,119,923
DATED       : June 9, 1992
INVENTOR(S) : Jonsson et al.

It is certified that error appears in the above-identified patent and that said Letters Patent is hereby corrected as shown below:

Column 21, line 16, "a speed controller" should be --the speed controller--.

line 41, "inlput" should be --input--.

Signed and Sealed this

Ninth Day of November, 1993

Attest:

BRUCE LEHMAN

*Attesting Officer*     *Commissioner of Patents and Trademarks*